United States Patent
Hong et al.

(10) Patent No.: US 10,439,742 B2
(45) Date of Patent: Oct. 8, 2019

(54) DEVICE AND METHOD FOR PERFORMING CHANNEL DECODING OPERATION IN COMMUNICATION SYSTEM

(71) Applicant: Samsung Electronics Co., Ltd., Gyeonggi-do (KR)

(72) Inventors: Sung-Nam Hong, Anyang-si (KR); Tae-Young Kim, Seongnam-si (KR); Min Sagong, Suwon-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/577,739

(22) PCT Filed: May 27, 2016

(86) PCT No.: PCT/KR2016/005649
§ 371 (c)(1),
(2) Date: Nov. 28, 2017

(87) PCT Pub. No.: WO2016/190710
PCT Pub. Date: Dec. 1, 2016

(65) Prior Publication Data
US 2018/0131454 A1 May 10, 2018

(30) Foreign Application Priority Data
Jun. 11, 2015 (KR) .................. 10-2015-0082858

(51) Int. Cl.
*H04B 17/318* (2015.01)
*H04L 1/00* (2006.01)
(Continued)

(52) U.S. Cl.
CPC ......... *H04B 17/318* (2015.01); *H04L 1/0045* (2013.01); *H04L 1/0048* (2013.01);
(Continued)

(58) Field of Classification Search
CPC ............ H04L 1/0048; H04L 25/03184; H04L 5/0007; H04L 5/0048; H04L 1/0045; H04B 17/318
See application file for complete search history.

(56) References Cited

U.S. PATENT DOCUMENTS

2011/0007695 A1 1/2011 Choi et al.
2011/0228883 A1 9/2011 Liu et al.
(Continued)

OTHER PUBLICATIONS

Soret et al.; "CRS Interference Cancellation in Heterogeneous Networks for LTE-Advanced Downlink"; 2012 IEEE International Conference on Communications (ICC); Ottawa, Ontario, Canada; Jun. 10-15, 2012; 5 pages.
(Continued)

*Primary Examiner* — Syed Haider

(57) ABSTRACT

The present invention relates to not only a 4th-generation (4G) communication system such as long term evolution (LTE), but also a 5th-generation (5G) or pre-5G communication system which is provided to support a higher data rate. The present invention provides a method for performing a channel decoding operation by a reception device in a communication system, the method comprising the steps of: generating at least two resource elements (REs) into at least two RE groups; and generating a soft decision decoding metric for a signal received through each of the at least two RE groups.

11 Claims, 19 Drawing Sheets

(51) Int. Cl.
*H04L 5/00* (2006.01)
*H04L 25/03* (2006.01)

(52) U.S. Cl.
CPC .......... *H04L 5/0007* (2013.01); *H04L 5/0048* (2013.01); *H04L 25/03184* (2013.01)

(56) References Cited

U.S. PATENT DOCUMENTS

| | | | |
|---|---|---|---|
| 2012/0033767 A1 | 2/2012 | Wilborn et al. | |
| 2013/0114496 A1* | 5/2013 | Mazzarese | H04L 5/0023 370/312 |
| 2013/0322350 A1 | 12/2013 | Gaur et al. | |
| 2014/0029456 A1 | 1/2014 | Mallik et al. | |
| 2014/0192857 A1 | 7/2014 | Perets et al. | |
| 2015/0003275 A1 | 1/2015 | Krishnamurthy | |
| 2015/0092583 A1* | 4/2015 | Balraj | H04L 1/0003 370/252 |
| 2015/0373724 A1* | 12/2015 | Ibrahim | H04W 24/08 370/252 |
| 2017/0180100 A1* | 6/2017 | Lee | H04L 5/0032 |

OTHER PUBLICATIONS

Davydov et al.; "LLR-based Interference Suppression for the Physical Downlink Control Channel of LTE-A"; 2014 IEEE Annual International Symposium on Personal, Indoor, and Mobile Radio Communication (PIMRC); Washington, D.C., USA; Sep. 2-5, 2014; 6 pages.

* cited by examiner $$L_{k,\lambda}^{G}(R[k], a[k], \text{RB index}, \text{Group index})$$

$$\approx \left[ \sqrt{ \frac{1}{\left( \beta_{\text{Group index}}^{\text{RB index}} \right)^2} \left\{ \min_{s \in A_0^\lambda} \left| R[k] - a[k]s \right|^2 - \min_{s \in A_1^\lambda} \left| R[k] - a[k]s \right|^2 \right\} } \right] \quad \alpha_{\text{Group index}}^{\text{RB index}}$$

→ Substitution with multiplication and Root computation where $\alpha_{\text{Group index}}^{\text{RB index}} = \dfrac{-0.3398}{\ln\left( \dfrac{\left( D_{1.\text{Group index}}^{\text{RB index}} \right)^2}{D_{2.\text{Group index}}^{\text{RB index}}} + 0.0101 \right) + 0.0589}$ , $\beta_{\text{Group index}}^{\text{RB index}} = \boxed{\dfrac{\Gamma(2/\alpha)}{\Gamma(4/\alpha)}} D_{2.\text{Group index}}^{\text{RB index}}$ → Constant value $D_{2.\text{Group index}}^{\text{RB index}} = \dfrac{1}{N_{\text{Group index}}^{\text{RB index}}} \sum_{k \in V_{\text{Group index}}^{\text{RB index}}} X_2[k]$ , $D_{1.\text{Group index}}^{\text{RB index}} = \dfrac{1}{N_{\text{Group index}}^{\text{RB index}}} \sum_{k \in V_{\text{Group index}}^{\text{RB index}}} X_1[k]$ $X_2[k] = \min_{s \in A_0 \cup A_1} \left| R[k] - a[k]s \right|^2$, $X_1[k] = \sqrt{X_2[k]}$

FIG.23

DEVICE AND METHOD FOR PERFORMING CHANNEL DECODING OPERATION IN COMMUNICATION SYSTEM

CROSS-REFERENCE TO RELATED APPLICATIONS AND CLAIM OF PRIORITY

This application is a U.S. National Stage application under 35 U.S.C. § 371 of an International application filed on May 27, 2016 and assigned application number PCT/KR2016/005649, which claimed the benefit of Korean patent applications Nos. 10-2015-0074835 and 10-2015-0082858 filed on May 28, 2015 and Jun. 11, 2015, the entire disclosures of each of which are hereby incorporated by reference.

TECHNICAL FIELD

The present disclosure relates to an apparatus and method for performing a channel decoding operation in a communication system, and more particularly, to an apparatus and method for performing a channel decoding operation by considering interference.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In a downlink/uplink of a communication system supporting an orthogonal frequency division multiple access (OFDMA) scheme, inter-cell interference (ICI) may significantly degrade performance of a signal receiving apparatus. Particularly, if a reference signal, e.g., a pilot signal, which is used for the signal receiving apparatus to estimate a channel or to measure a channel is distorted due to influence of the ICI, the performance of the signal receiving apparatus may be significantly degraded.

So, most communication standards supporting an OFDMA scheme, e.g., an LTE use various schemes, e.g., a scheme of differently setting location of a reference signal used in each of cells, a scheme of power boosting a reference signal compared to a data signal, e.g., a data symbol and transmitting the power boosted reference signal, and/or the like.

For example, a downlink of an LTE mobile communication system defines that neighbor base stations shift cell-specific reference signals (CRSs) from a specific CRC on a frequency axis based on different offsets and transmit the shifted CRSs, and each base station may power boost a corresponding CRS using a transmission power greater than transmission power applied to a data signal to transmit the power boosted CRS.

The schemes as described above may decrease a degree of distortion of a reference signal due to ICI thereby preventing relatively large degradation of channel estimation performance and channel measurement performance of a signal receiving apparatus.

However, the power boosted reference signal as described above becomes ICI for a data signal included in a target signal, so a non-Gaussian characteristic of an interference signal occurs due to this. This will be described with reference to FIGS. 1 and 2.

Firstly, relation among an interference signal, a target signal, and a received signal in a general LTE mobile communication system will be described with reference to FIG. 1.

FIG. 1 schematically illustrates relation among an interference signal, a target signal, and a received signal in a general LTE mobile communication system.

Referring to FIG. 1, it will be noted that an interference signal, a target signal, and a received signal in FIG. 1 are shown on a resource block (RB) unit basis. Here, an RB includes at least one resource element (RE).

An interference signal 111 denotes a signal transmitted from a neighbor cell, and the interference signal 111 includes, for example, a physical downlink control channel (PDCCH) signal and a CRS transmitted from the neighbor cell.

Further, a target signal 113 denotes a signal transmitted from a corresponding cell, and the target signal 113 includes, for example, a PDCCH signal and a CRS transmitted from the corresponding cell.

Meanwhile, a received signal 115 denotes a signal which a corresponding signal receiving apparatus, e.g., a user equipment (UE) receives, and the received signal 115 includes the PDCCH signal and CRS included in the target signal 113 and the PDCCH signal and CRS included in the reference signal 111.

In the LTE mobile communication system, location of CRSs is differently set among neighbor cells, so specific REs among REs included in an RB through which the target signal 113 is transmitted may be affected by the CRS included in the interference signal 111, and may be further affected by a PDSCH included in the interference signal 111 according to a situation.

Relation among an interference signal, a target signal, and a received signal in a general LTE mobile communication system has been described with reference to FIG. 1, and ICI distribution for an RE group affected by an interference CRS in a general LTE mobile communication system will be described with reference to FIG. 2.

FIG. 2 schematically illustrates ICI distribution for an RE group affected by an interference CRS in a general LTE mobile communication system.

Referring to FIG. 2, an ICI distribution graph as shown in FIG. 2 indicates an ICI distribution graph for an RE group in a case that a signal receiving apparatus, e.g., a UE uses one antenna port, and the number of neighbor cells is 1. In the ICI distribution graph as shown in FIG. 2, a vertical axis indicates a histogram of ICI, and a horizontal axis indicates a real part of the ICI.

Generally, a CRS is boosted with power which is greater than power applied to a data signal by a preset value, e.g., 12 [dB]. So, a CRS transmitted from a neighbor cell may act as ICI for specific REs among REs included in an RB, i.e., target RB, through a target signal of a corresponding cell is transmitted, so a non-Gaussian of an interference signal occurs due to this.

As illustrated in FIG. 2, it will be understood that ICI 213 for a data region shows a Gaussian characteristic, and ICI 211 for a CRS region shows a non-Gaussian characteristic. In FIG. 2, a reference number 215 indicates a Gaussian probability density function (PDF).

ICI distribution for an RE group affected by an interference CRS in a general LTE mobile communication system has been described with reference to FIG. 2, and a process of performing a channel decoding operation in a signal receiving apparatus in an interference environment with a non-Gaussian characteristic in a general LTE mobile communication system will be described with reference to FIG. 3.

FIG. 3 schematically illustrates a process of performing a channel decoding operation in a signal receiving apparatus in an interference environment with a non-Gaussian characteristic in a general LTE mobile communication system.

Referring to FIG. 3, a signal receiving apparatus calculates an LLR for a received signal at operation 311, and this will be described below.

The signal receiving apparatus detects a data signal which is affected by a target reference signal from the received signal at operation 313, and proceeds to operation 315. Here, the target reference signal denotes a reference signal transmitted from a cell to which the signal receiving apparatus belongs, i.e., a serving cell. The signal receiving apparatus cancels a component related to the target reference signal from the data signal which is affected by the target reference signal at operation 315, and proceeds to operation 317.

The signal receiving apparatus estimates variance of noise which is affected by ICI based on the target reference signal at operation 317, and proceeds to operation 311. The signal receiving apparatus applies a Gaussian PDF based on the estimated variance of the noise to calculate a soft decision decoding metric, e.g., a log-likelihood ratio (LLR) for the received signal at operation 311.

The channel decoding operation of the signal receiving apparatus as described in FIG. 3 is a channel decoding operation in a case that the signal receiving apparatus may not receive location information for a reference signal transmitted from a neighbor cell.

As described above, currently in most communication standards supporting an OFDMA scheme, location of reference signals used in neighbor cells is differently set, so influence of a power boosted interference reference signal is not reflected in the received target reference signal.

So, a channel decoding operation using an LLR calculated based on a scheme as described in FIG. 3 may not reflect influence of power boosted interference reference signal, so the channel decoding operation may significantly degrade channel decoding performance of a signal receiving apparatus.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for performing a channel decoding operation in a communication system.

An embodiment of the present disclosure proposes an apparatus and method for performing a channel decoding operation based on RE grouping in a communication system.

An embodiment of the present disclosure proposes an apparatus and method for performing a channel decoding operation using a plurality of soft decision decoding metric generating schemes in a communication system.

An embodiment of the present disclosure proposes an apparatus and method for performing a channel decoding operation by considering interference in a communication system.

An embodiment of the present disclosure proposes an apparatus and method for performing a channel decoding operation by considering interference regardless of whether location information for an interference reference signal is provided in a communication system.

An embodiment of the present disclosure proposes an apparatus and method for performing a channel decoding operation by considering interference based on RE grouping in a communication system.

An embodiment of the present disclosure proposes an apparatus and method for performing a channel decoding operation by considering a Gaussian characteristic of an interference signal and a non-Gaussian characteristic of the interference signal in a communication system.

According to an embodiment of the present disclosure, a method for performing a channel decoding operation by a receiving apparatus in a communication system is provided. The method includes generating at least two resource elements (REs) as at least two RE groups, and generating a soft decision decoding metric for a signal received through each of the at least two RE groups.

According to an embodiment of the present disclosure, an operating method of a transmitting apparatus in a communication system is provided. The operating method includes transmitting, to a receiving apparatus, information related to an interference signal, wherein the information related to the interference signal is used for the receiving apparatus to perform an operation of generating at least two resource elements (REs) as at least two RE groups, and an operation of generating a soft decision decoding metric for a signal received through each of the at least two RE groups.

According to an embodiment of the present disclosure, a receiving apparatus in a communication system is provided. The receiving apparatus includes a soft decision decoding metric generator configured to perform an operation of generating at least two resource elements (REs) as at least two RE groups, and to perform an operation of generating a soft decision decoding metric for a signal received through each of the at least two RE groups.

According to an embodiment of the present disclosure, a transmitting apparatus in a communication system is provided. The transmitting apparatus includes a transmitter configured to transmit, to a receiving apparatus, information related to an interference signal, wherein the information related to the interference signal is used for the receiving apparatus to perform an operation of generating at least two resource elements (REs) as at least two RE groups, and an operation of generating a soft decision decoding metric for a signal received through each of the at least two RE groups.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

An embodiment of the present disclosure enables to perform a channel decoding operation in a communication system.

An embodiment of the present disclosure enables to perform a channel decoding operation based on resource element (RE) grouping in a communication system.

An embodiment of the present disclosure enables to perform a channel decoding operation using a plurality of soft decision decoding metric generating schemes in a communication system.

An embodiment of the present disclosure enables to perform a channel decoding operation by considering interference in a communication system.

An embodiment of the present disclosure enables to perform a channel decoding operation by considering interference regardless of whether location information for an interference reference signal is provided in a communication system.

An embodiment of the present disclosure enables to perform a channel decoding operation by considering interference based on RE grouping in a communication system.

An embodiment of the present disclosure enables to perform a channel decoding operation by considering a Gaussian characteristic of an interference signal and a non-Gaussian characteristic of the interference signal in a communication system.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIG. 23 schematically illustrates the generated LLR to the channel decoder 2221.

Throughout the drawings, it should be noted that like reference numbers are used to depict the same or similar elements, features, and structures.

DETAILED DESCRIPTION

Figure 1:
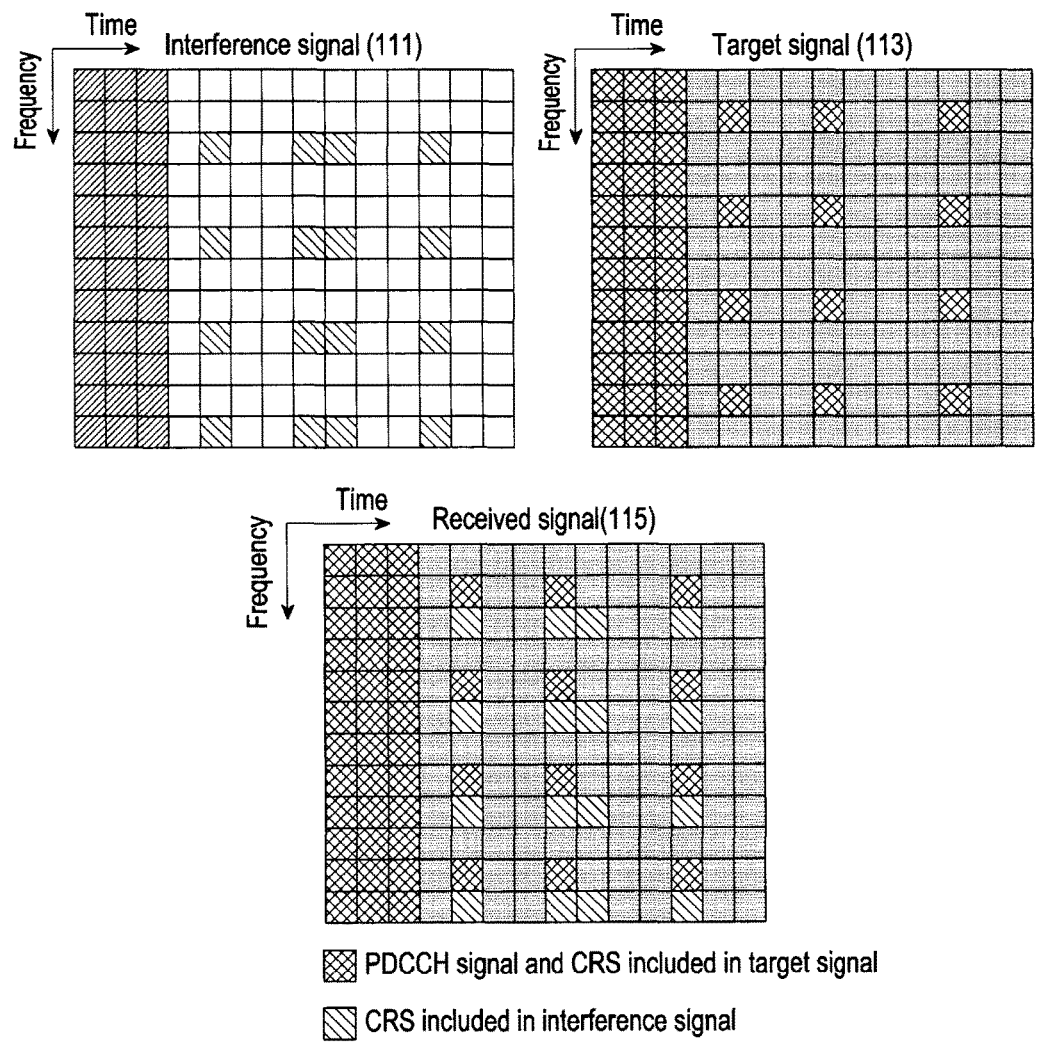
FIG. 1 schematically illustrates relation among an interference signal, a target signal, and a received signal in a general LTE mobile communication system.
Figure 2:
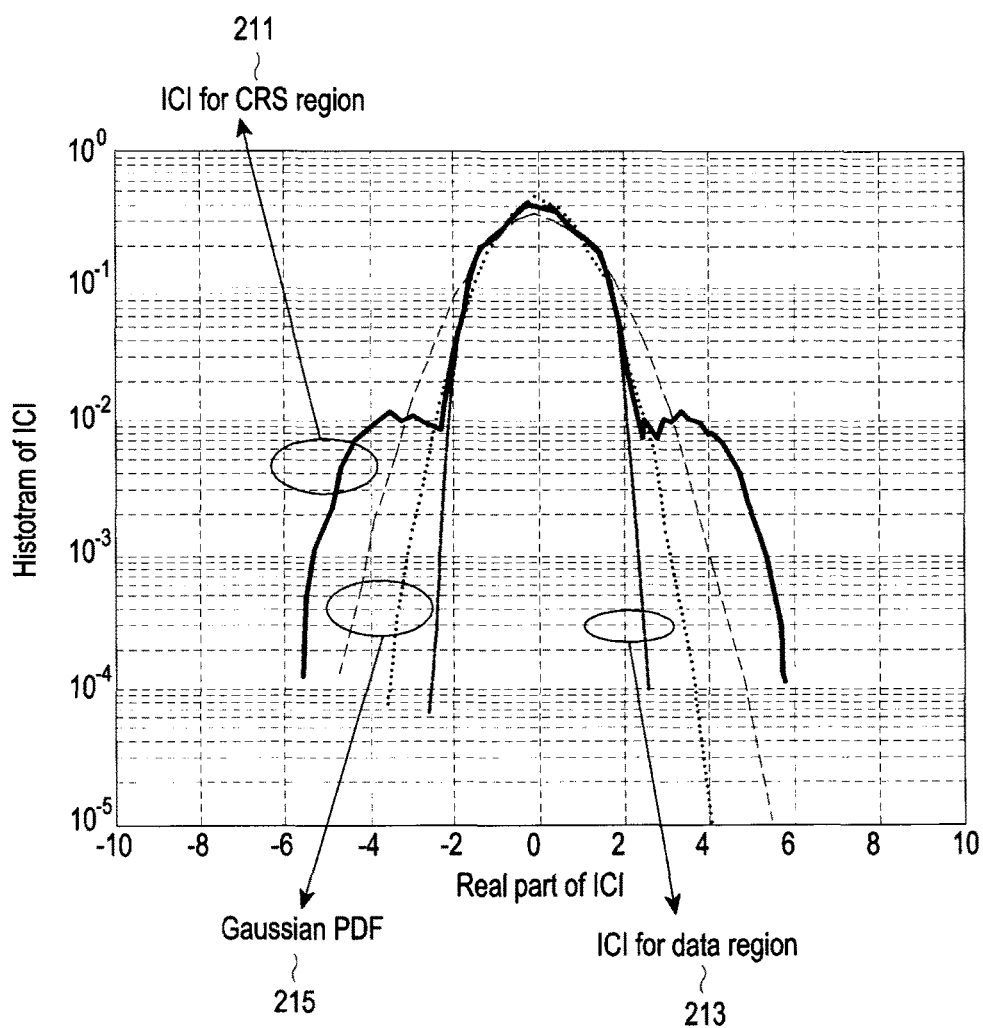
FIG. 2 schematically illustrates ICI distribution for an RE group affected by an interference CRS in a general LTE mobile communication system.
Figure 3:
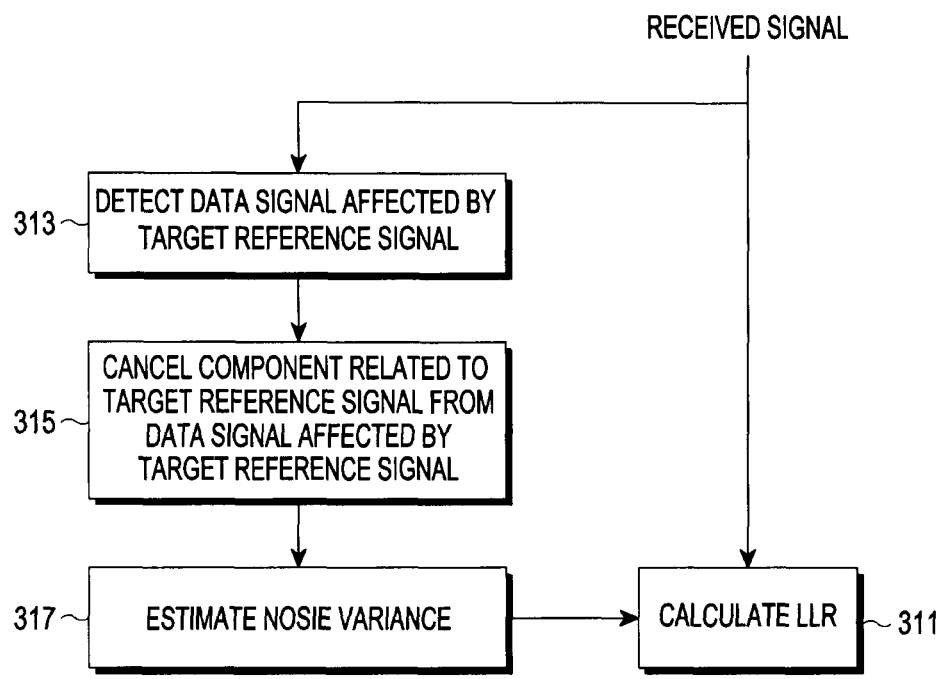
FIG. 3 schematically illustrates a process of performing a channel decoding operation in a signal receiving apparatus in an interference environment with a non-Gaussian characteristic in a general LTE mobile communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be, for example, a user equipment (UE), and a signal transmitting apparatus may be, for example, a base station.

In various embodiments of the present disclosure, it will be noted that the term UE may be interchangeable with the terms mobile station (MS), wireless terminal, mobile device, and/or the like.

In various embodiments of the present disclosure, it will be noted that the term base station may be interchangeable with the terms node B, evolved Node B (eNB), access point (AP), and/or the like.

An embodiment of the present disclosure proposes an apparatus and method for performing a channel decoding operation in a communication system.

An embodiment of the present disclosure proposes an apparatus and method for performing a channel decoding operation based on resource element (RE) grouping in a communication system.

An embodiment of the present disclosure proposes an apparatus and method for performing a channel decoding operation using a plurality of soft decision decoding metric generating schemes in a communication system.

An embodiment of the present disclosure proposes an apparatus and method for performing a channel decoding operation by considering interference in a communication system.

An embodiment of the present disclosure proposes an apparatus and method for performing a channel decoding operation by considering interference regardless of whether location information for an interference reference signal is provided in a communication system.

An embodiment of the present disclosure proposes an apparatus and method for performing a channel decoding operation by considering interference based on RE grouping in a communication system.

An embodiment of the present disclosure proposes an apparatus and method for performing a channel decoding operation by considering a Gaussian characteristic of an interference signal and a non-Gaussian characteristic of the interference signal in a communication system.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

An example of an inner structure of a signal transmitting apparatus in a communication system supporting an OFDMA scheme according to an embodiment of the present disclosure will be described with reference to FIG. 4.

Figure 4:
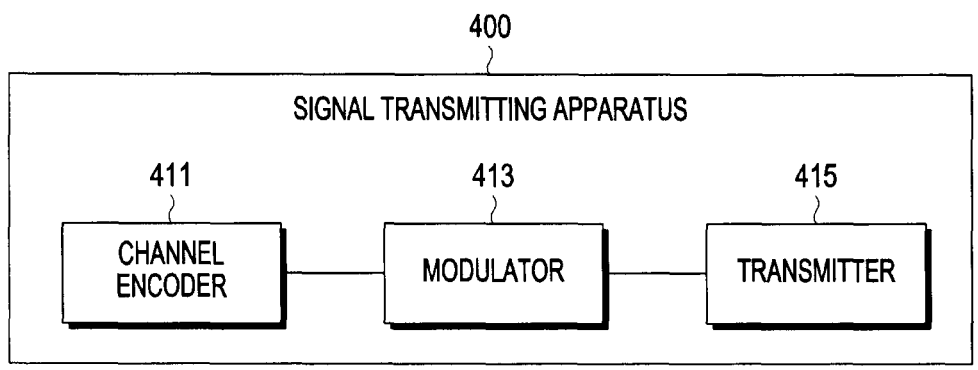
FIG. 4 schematically illustrates an example of an inner structure of a signal transmitting apparatus in a communication system supporting an orthogonal frequency division multiple access (OFDMA) scheme according to an embodiment of the present disclosure.

FIG. 4 schematically illustrates an example of an inner structure of a signal transmitting apparatus in a communication system supporting an orthogonal frequency division multiple access (OFDMA) scheme according to an embodiment of the present disclosure.

Referring to FIG. 4, a signal transmitting apparatus 400 may be, for example, a base station, and includes a channel encoder 411, a modulator 413, and a transmitter 415.

When information is inputted, the channel encoder 411 generates encoded bits by channel encoding the information based on a preset channel encoding scheme, and outputs the generated encoded-bits to the modulator 413. Here, the encoded bits may be, for example, one of a binary channel code. The binary channel code may be, for example, one of a convolutional code, a turbo code, a low density parity check (LDPC), and/or the like.

The modulator 413 generates the encoded bits outputted from the channel encoder 411 based on a preset modulation scheme, e.g., a quadrature phase shift keying (QPSK) scheme to generate a modulation symbol, and outputs the modulation symbol to the transmitter 415.

The transmitter 415 performs a transmission signal processing on the modulation symbol outputted from the modulator 413 to output the transmission signal processed-signal to a signal receiving apparatus, e.g., a UE. The transmitter 415 transmits information related to an interference signal, the information related to the interference signal will be described below, and a detailed description thereof will be omitted herein.

Although the channel encoder 411, the modulator 413, and the transmitter 415 are described as separate units in the signal transmitting apparatus 400 in FIG. 4, it is to be understood that the signal transmitting apparatus 400 may be implemented with a form into which at least two of the channel encoder 411, the modulator 413, and the transmitter 415 are incorporated. The signal transmitting apparatus 400 may be implemented with one processor.

An example of an inner structure of a signal transmitting apparatus in a communication system supporting an OFDMA scheme according to an embodiment of the present disclosure has been described with reference to FIG. 4, and an example of an inner structure of a signal receiving apparatus in a communication system supporting an OFDMA scheme according to an embodiment of the present disclosure will be described with reference to FIG. 5.

Figure 5:
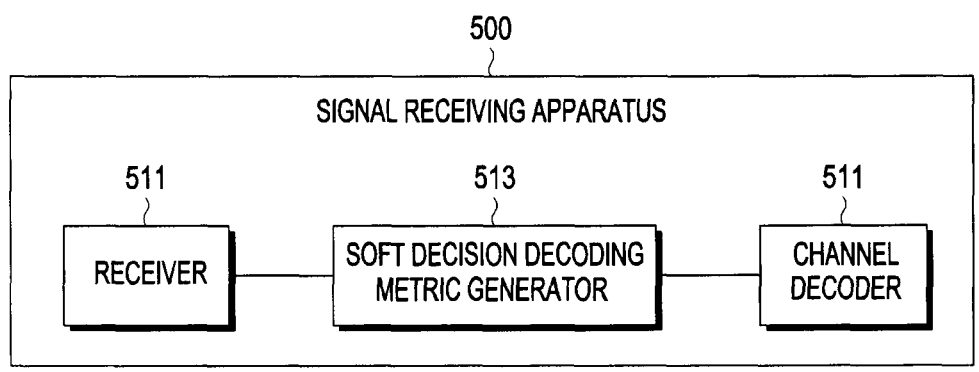
FIG. 5 schematically illustrates an example of an inner structure of a signal receiving apparatus in a communication system supporting an OFDMA scheme according to an embodiment of the present disclosure.

FIG. 5 schematically illustrates an example of an inner structure of a signal receiving apparatus in a communication system supporting an OFDMA scheme according to an embodiment of the present disclosure.

Referring to FIG. 5, a signal receiving apparatus 500 may be, for example, a UE, and includes a receiver 511, a soft decision decoding metric generator 513, and a channel decoder 515.

The receiver 511 receives a signal transmitted from a signal transmitting apparatus through a channel, and outputs the received signal to the soft decision decoding metric generator 513.

The soft decision decoding metric generator 513 detects a soft decision decoding metric, e.g., a reliability value for the received signal to output the soft decision decoding metric to the channel decoder 515. For example, in a case that a QPSK modulation scheme is applied, the soft decision decoding metric generator 513 inputs one received symbol in a form of one complex value, and detects a reliability value for two bits based on this. Here, the reliability value may be, for example, a log-likelihood ratio (LLR), so the soft decision decoding metric generator 513 may be referred to as LLR generator.

The soft decision decoding metric generator 513 may perform an RE grouping process according to an embodiment of the present disclosure to generate RE groups, and separately applies a soft decision decoding metric generating scheme, e.g., a Gaussian probability density function (PDF) or a non-Gaussian PDF to each of the RE groups to detect a soft decision decoding metric. A typical one of the non-Gaussian PDF is a complex-generalized Gaussian (CGG) PDF, and/or the like. The RE grouping process and the soft decision decoding metric detecting operation which the soft decision decoding metric generator 513 performs will be described below, and a detailed description thereof will be omitted herein.

The channel decoder 515 performs a channel decoding operation which corresponds to a preset channel decoding scheme based on the reliability value outputted from the soft decision decoding metric generator 513 to generate decoded bits, and outputs the decoded bits.

Although the receiver 511, the soft decision decoding metric generator 513, and the channel decoder 515 are described as separate units in the signal receiving apparatus 500 in FIG. 5, it is to be understood that the signal receiving apparatus 500 may be implemented with a form into which at least two of the receiver 511, the soft decision decoding metric generator 513, and the channel decoder 515 are incorporated. The signal receiving apparatus 500 may be implemented with one processor.

An example of an inner structure of a signal receiving apparatus in a communication system supporting an OFDMA scheme according to an embodiment of the present disclosure has been described with reference to FIG. 5, and an example of a process of generating a soft decision decoding metric in a signal receiving apparatus in a communication system supporting an OFDMA scheme according to an embodiment of the present disclosure will be described with reference to FIG. 6.

Figure 6:
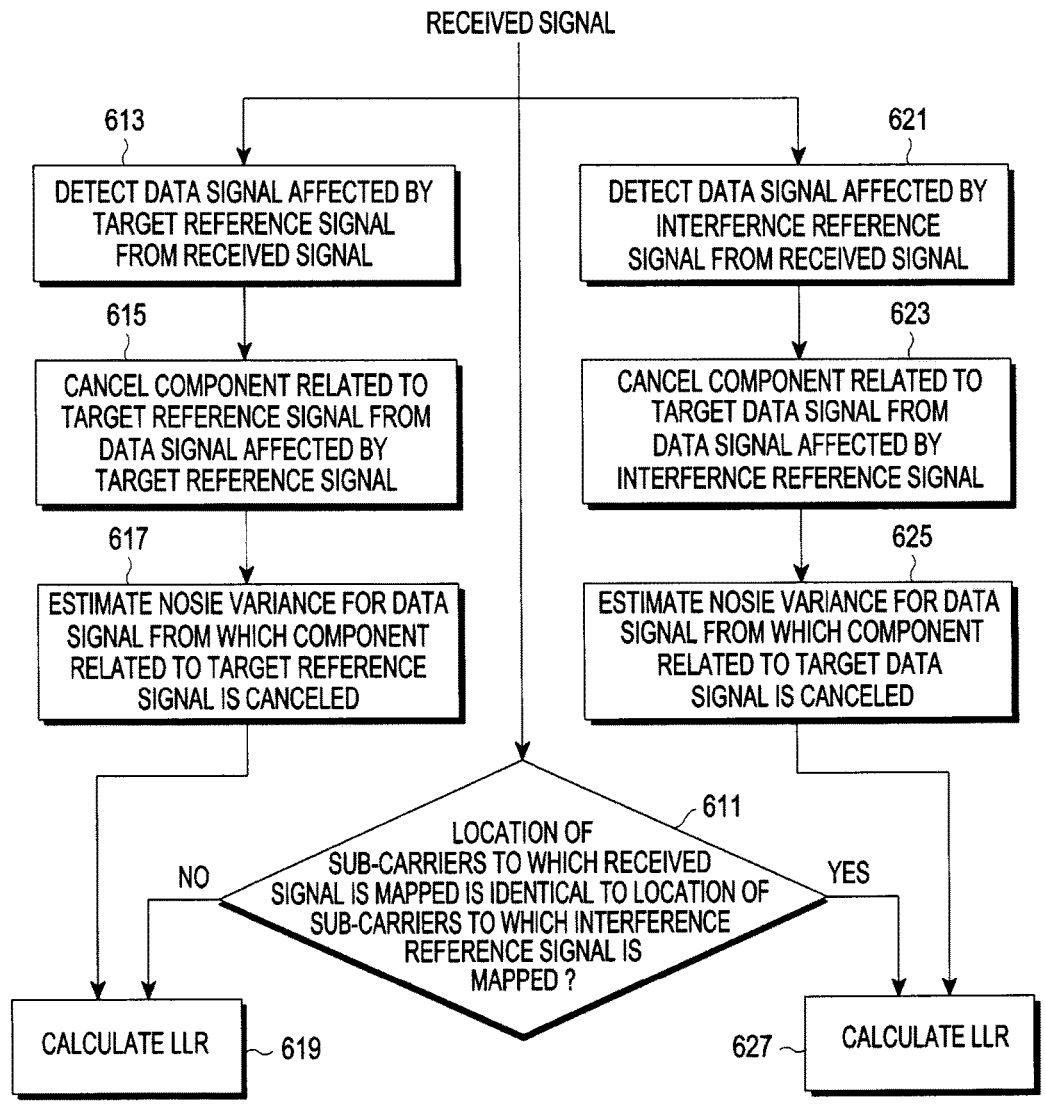
FIG. 6 schematically illustrates an example of a process of generating a soft decision decoding metric in a signal receiving apparatus in a communication system supporting an OFDMA scheme according to an embodiment of the present disclosure.

FIG. 6 schematically illustrates an example of a process of generating a soft decision decoding metric in a signal receiving apparatus in a communication system supporting an OFDMA scheme according to an embodiment of the present disclosure.

Referring to FIG. 6, it will be noted that a process of generating a soft decision decoding metric in a signal receiving apparatus as shown in FIG. 6 is a process of generating a soft decision decoding metric in a signal receiving apparatus in a case that location information for an interference reference signal which may be inter-cell interference (ICI) is provided. Here, an interference reference signal denotes a reference signal transmitted by a neighbor base station, not a base station, i.e., a serving base station, to which a corresponding signal receiving apparatus, e.g., a UE currently belongs. For convenience, the reference signal transmitted by the serving base station will be referred to as target reference signal.

When a received signal is inputted, the signal receiving apparatus determines whether location of sub-carriers to which the received signal is mapped is identical to location of sub-carriers to which an interference reference signal is mapped at operation 611. If the location of the sub-carriers to which the received signal is mapped is not identical to the location of the sub-carriers to which the interference reference signal is mapped, the signal receiving apparatus proceeds to operation 619. If the location of the sub-carriers to which the received signal is mapped is identical to the location of the sub-carriers to which the interference reference signal is mapped, the signal receiving apparatus proceeds to operation 627.

Meanwhile, the signal receiving apparatus detects a data signal which is affected by a target reference signal from the received signal at operation 613, and proceeds to operation 615. The signal receiving apparatus cancels a component related to the target reference signal from the data signal which is affected by the target reference signal at operation 615, and proceeds to operation 617. The signal receiving apparatus estimates noise variance for a data signal from which the component related to the target reference signal is canceled at operation 617, and proceeds to operation 619. A detailed description of an operation of estimating the noise variance will be omitted herein. The signal receiving apparatus calculates a soft decision decoding metric, i.e., an LLR based on the noise variance which is estimated for the data signal from which the component related to the target reference signal is canceled at operation 619.

Meanwhile, the signal receiving apparatus detects a data signal which is affected by an interference reference signal from the received signal at operation 621, and proceeds to operation 623. The signal receiving apparatus cancels a component related to a target data signal from the data signal which is affected by the interference reference signal at operation 623, and proceeds to operation 625. Here, the target data signal denotes a data signal actually transmitted by a signal transmitting apparatus, and has been estimated already by the signal receiving apparatus.

The signal receiving apparatus estimates noise variance for a data signal from which the component related to the target data signal is canceled at operation 625, and proceeds to operation 627. A detailed description of an operation of estimating the noise variance will be omitted herein. The signal receiving apparatus calculates a soft decision decoding metric, i.e., an LLR based on the noise variance which is estimated for the data signal from which the component related to the target data signal is canceled at operation 627.

Although FIG. 6 illustrates an example of a process of generating a soft decision decoding metric in a signal receiving apparatus in a communication system supporting an OFDMA scheme according to an embodiment of the present disclosure, various changes could be made to FIG. 6. For example, although shown as a series of operations, various operations in FIG. 6 could overlap, occur in parallel, occur in a different order, or occur multiple times.

As described in FIG. 6, if it is possible that a signal receiving apparatus receives location information for an interference reference signal, the a signal receiving apparatus calculates an LLR based on noise variance for a data signal affected by a target reference signal and noise variance for a data signal affected by an interference reference signal.

In a case of calculating an LLR like this, the signal receiving apparatus needs to estimate the target data signal in order to estimate the noise variance for the data signal affected by the interference reference signal, an error may occur upon estimating the target data signal.

The signal receiving apparatus separately estimates noise variance based on only a data signal which is affected by an interference signal, so the number of samples used for estimating the noise variance is not sufficient. In this case, error may occur upon estimating noise variance since the number of samples is not sufficient.

So, an embodiment of the present disclosure proposes a scheme which may generate a soft decision decoding metric regardless of whether a signal receiving apparatus may receive location information for an interference reference signal.

Another example of a process of generating a soft decision decoding metric in a signal receiving apparatus in a communication system supporting an OFDMA scheme according to an embodiment of the present disclosure will be described with reference to FIG. 7.

Figure 7:
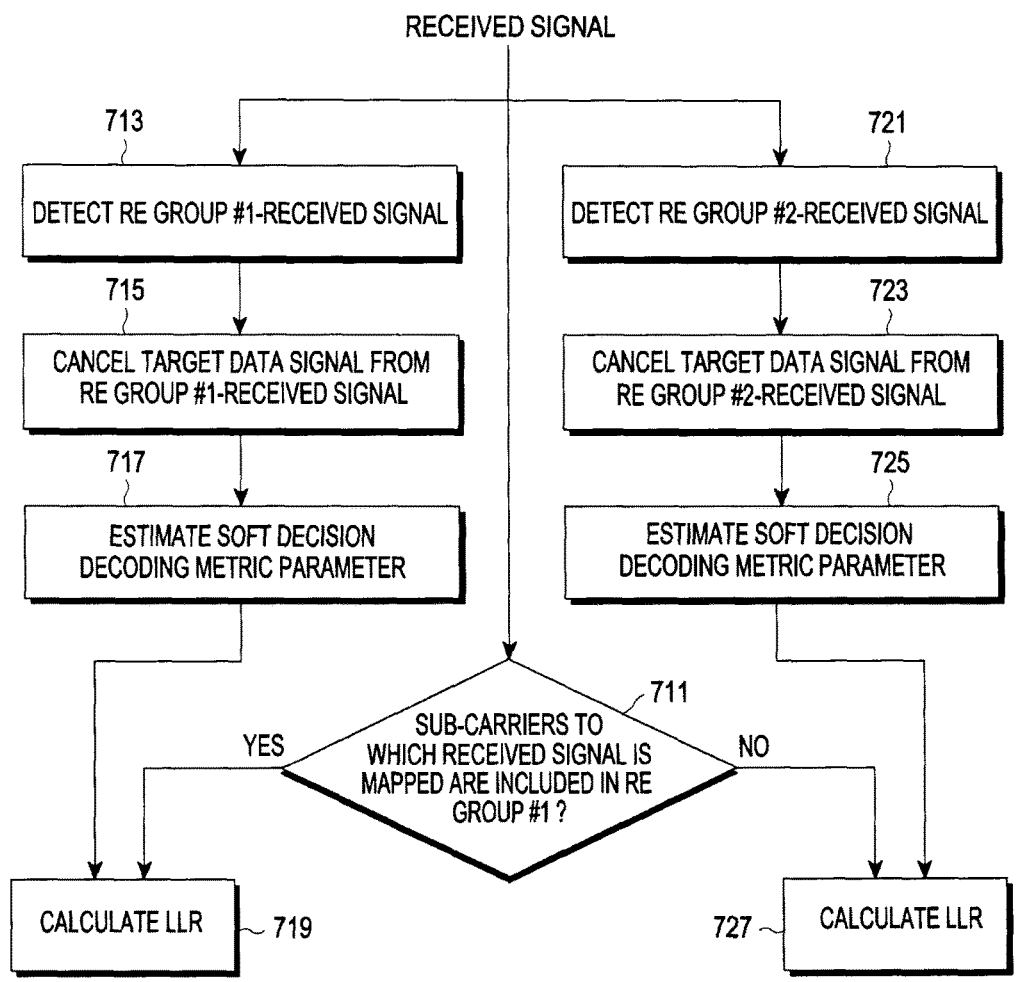
FIG. 7 schematically illustrates another example of a process of generating a soft decision decoding metric in a signal receiving apparatus in a communication system supporting an OFDMA scheme according to an embodiment of the present disclosure.

FIG. 7 schematically illustrates another example of a process of generating a soft decision decoding metric in a signal receiving apparatus in a communication system supporting an OFDMA scheme according to an embodiment of the present disclosure.

Referring to FIG. 7, it will be noted that a process of generating a soft decision decoding metric in a signal receiving apparatus as shown in FIG. 7 is a process of generating a soft decision decoding metric in a signal receiving apparatus regardless of whether location information for an interference reference signal is provided to the signal receiving apparatus.

When a received signal is inputted, the signal receiving apparatus determines whether sub-carries to which the received signal is mapped are included in a group#1 at operation 711. If the sub-carries to which the received signal is mapped are included in the RE group#1, the signal receiving apparatus proceeds to operation 719. If the sub-carries to which the received signal is mapped are not included in the RE group#1, that is, if the sub-carries to which the received signal is mapped are included in an RE group#2, the signal receiving apparatus proceeds to operation 727.

Each of the RE group#1 and the RE group#1 will be described below.

An RE group includes at least one RE, and an RE may be, for example, a sub-carrier. In an embodiment of the present disclosure, the communication system supports the OFDMA scheme, so it has been assumed that the RE is, for example, the sub-carrier, however, if the communication system does not support the OFDMA scheme, the RE may be a resource in a different form, not the sub-carrier.

The RE group#1 includes REs, and a signal received through the REs is not affected by a boosted interference signal. Here, the boosted interference signal may be, for example, a target reference signal, an interference reference signal, and/or the like.

The RE group#2 includes REs, and there is a possibility that a signal received through the REs is affected by a boosted interference signal.

For example, in a case of a downlink in an LTE mobile communication system, location of sub-carriers through which a cell-specific reference signal (CRS) is transmitted is determined based on a cell identifier (ID) of a corresponding cell, and the location of the sub-carriers through which the CRS is transmitted is determined based on a limited pattern.

So, a signal receiving apparatus, e.g., a UE may detect sub-carriers which is likely to be affected by a CRS, and these sub-carriers may be included in the RE group#2. That is, sub-carriers which are mapped to a CRS transmitted by a serving cell to which a UE currently belongs, i.e., a target CRS and sub-carriers which are mapped to a CRS transmitted by a neighbor cell, i.e., an interference CRS may be included in the RE group#2.

An RE grouping process of generating the RE group#1 and the RE group#2 will be described below, so a detailed description thereof will be omitted herein.

Meanwhile, the signal receiving apparatus detects a received signal which corresponds to the RE group #1 from the received signal at operation 713, and proceeds to operation 715. For convenience, the received signal corresponding to the RE group #1 will be referred to as 'RE group #1-received signal'. The signal receiving apparatus cancels a target data signal from an RE group #1-received signal at operation 715, and proceeds to operation 717. The target data signal denotes a data signal actually transmitted by a signal transmitting apparatus, and has been estimated already by the signal receiving apparatus. Particularly, there are no REs through a CRS is transmitted in the RE group #1, so there is no reference signal used for estimating a statistical characteristic of interference and noise variance. So, the signal receiving apparatus performs a hard decision operation or a soft decision operation on a received signal in advance to estimate the target data signal.

The signal receiving apparatus estimates a soft decision decoding metric parameter, e.g., noise variance, a shape parameter $\alpha$ of a complex-generalized Gaussian (CGG) probability density function (PDF) and a scale parameter $\beta$ of the CGG PDF, and/or the like based on the RE group#1-received signal from which the target data signal is canceled at operation 717, and proceeds to operation 719. Here, the CGG PDF is a typical non-Gaussian PDF.

If the signal receiving apparatus calculates the LLR based on the Gaussian PDF, the soft decision decoding metric parameter estimated at operation 717 may be the noise variance. If the signal receiving apparatus calculates the LLR based on the non-Gaussian PDF, the soft decision decoding metric parameter estimated at operation 717 may be the parameters of the CGG PDF, i.e., the shape parameter $\alpha$ and the scale parameter $\beta$ of the CGG PDF.

The signal receiving apparatus calculates a soft decision decoding metric, i.e., an LLR, for the received signal based on the estimated soft decision decoding metric parameter at operation 719.

The signal receiving apparatus detects a received signal which corresponds to the RE group#2 from the received signal at operation 721, and proceeds to operation 723. For convenience, the received signal which corresponds to the RE group#2 will be referred to as 'RE group#2-received signal'. As described above, the RE group#2 includes the REs, and there is the possibility that the signal received through the REs is affected by the boosted interference signal. So, the RE group#2 includes REs in which a CRS transmitted by a serving cell to which the signal receiving apparatus belong, i.e., a target CRS is received.

However, there is a high possibility that a characteristic of an interference signal which affects the target CRS is significantly different from a characteristic of an interference signal which affects a target data signal. The reason is that location of a reference signal is determined in order that the reference signal does not collide with a boosted interference signal for preventing distortion of the reference signal in most standards supporting an OFDMA scheme. So, a process similar to a process of the RE group #1 may be performed on the RE group #2 to estimate a characteristic of an interference signal which affects the REs included in the RE group #2 in which the data signal is received.

That is, the signal receiving apparatus cancels a target data signal from the RE group#2-received signal at operation 723, and proceeds to operation 725. The signal receiving apparatus estimates a soft decision decoding metric parameter, e.g., noise variance, a shape parameter $\alpha$ of a CGG PDF and a scale parameter $\beta$ of the CGG PDF, and/or the like based on the RE group#2-received signal from which the target data signal is canceled at operation 725, and proceeds to operation 727. If the signal receiving apparatus calculates the LLR based on the Gaussian PDF, the soft decision decoding metric parameter estimated at operation 725 may be the noise variance. If the signal receiving apparatus calculates the LLR based on the non-Gaussian PDF, the soft decision decoding metric parameter estimated at operation 725 may be the parameters of the CGG PDF, i.e., the shape parameter α and the scale parameter β of the CGG PDF.

The signal receiving apparatus calculates a soft decision decoding metric, i.e., an LLR for the received signal based on the estimated soft decision decoding metric parameter at operation 727.

Although FIG. 7 illustrates another example of a process of generating a soft decision decoding metric in a signal receiving apparatus in a communication system supporting an OFDMA scheme according to an embodiment of the present disclosure, various changes could be made to FIG. 7. For example, although shown as a series of operations, various operations in FIG. 7 could overlap, occur in parallel, occur in a different order, or occur multiple times.

Meanwhile, the RE group#2-received signal as described in FIG. 7 may be affected by a relatively strong-boosted interference signal, or may be affected by a relatively weak-boosted interference signal. So, there is a high possibility that a non-Gaussian characteristic of an interference signal occurs for the RE group#2-received signal.

So, it may be more advantageous that the signal receiving apparatus calculates the LLR for the RE group#2-received signal based on the non-Gaussian PDF compared to a case of calculating the LLR based on the Gaussian PDF in an aspect of performance improvement. Even though there is more advantageous aspect of performance improvement, the signal receiving apparatus may calculate the LLR based on the Gaussian PDF, not the non-Gaussian PDF for decreasing implementation complexity.

As described above, the signal receiving apparatus may generate a soft decision decoding metric by applying different Gaussian PDFs, i.e., different soft decision decoding metric generating scheme to the RE group #1 and the RE group #2.

As described above, in an embodiment of the present disclosure, REs used in a communication system are generated as RE groups based on a predetermined criterion, and PDFs applied to the RE groups are determined based on a characteristic of the RE groups. The predetermined criterion may be, for example, an interference characteristic, and/or the like. So, an embodiment of the present disclosure may calculate an LLR which is optimal for a corresponding RE. An RE grouping process of generating REs as RE groups and an operation of determining a soft decision decoding metric generating scheme applied to a corresponding RE group will be described below, and a detailed description thereof will be omitted herein.

As described above, an embodiment of the present disclosure proposes a scheme of calculating a soft decision decoding metric by applying an appropriate soft decision decoding metric generating scheme to each RE group, so a scheme of estimating an interference signal and a scheme of generating a soft decision decoding metric, e.g., a scheme of calculating an LLR are similar for each group.

So, an interference signal estimating scheme and an LLR calculating scheme proposed in an embodiment of the present disclosure will be described using, for example, an RE group #1, i.e., an RE group including REs which are not affected by a boosted interference signal.

If it is assumed that the kth received signal as a RE group #1-received signal among total received signals is y[k], a received signal after a target data signal is canceled from the kth received signal, i.e., a signal including an interference signal and background noise may be expressed as Equation 1.

$$\hat{z}[k] = y[k] - \hat{H}[k]\hat{s}[k] \quad \text{[Equation 1]}$$

In Equation 1, $\hat{z}[k]$ denotes the received signal after the target data signal is canceled from the kth received signal, $\hat{H}[k]$ denotes a fading channel estimation value, and $\hat{s}[k]$ denotes a hard decision (or soft decision) value of y[k].

So, a signal receiving apparatus may estimate a characteristic of an interference signal based on $\hat{z}[k]$. If the signal receiving apparatus calculates an LLR on an assumption that $\hat{z}[k]$ is a Gaussian random variable, the signal receiving apparatus needs to estimates variance for $\hat{z}[k]$.

If the signal receiving apparatus calculates an LLR based on a CGG PDF on an assumption that $\hat{z}[k]$ is a non-Gaussian random variable, the signal receiving apparatus needs to estimate a shape parameter α and a scale parameter β of the CGG PDF. A process of estimating the shape parameter α and the scale parameter β of the CGG PDF may be expressed as Equation 2.

$$\alpha = \frac{\ln(3^6/2^{10})}{\ln\left(\frac{\left(\frac{1}{N}\sum_{k=1}^{N}|\hat{z}[k]|\right)^2}{\frac{1}{N}\sum_{k=1}^{N}|\hat{z}[k]|^2} - \frac{\pi}{4} + \frac{9}{2^{3.5}}\right) + \ln\left(\frac{3}{2\sqrt{2}}\right)}, \quad \text{[Equation 2]}$$

$$\beta = \frac{\Gamma(2/\alpha)}{\Gamma(3/\alpha)} \frac{1}{N}\sum_{k=1}^{N}|\hat{z}[k]|$$

In Equation 2, N denotes the number of samples used as interference signals.

A process of calculating an LLR for a binary channel code transmitted by a signal transmitting apparatus based on a characteristic of an interference signal as described above may be expressed as Equation 3 and Equation 4.

$$L_{k,\lambda}^{G}(y[k], \hat{H}[k]) = \ln \frac{\sum_{w \in A_0^{\lambda}} f_z(y[k] - \hat{H}[k]w \mid \sigma^2)}{\sum_{w \in A_1^{\lambda}} f_z(y[k] - \hat{H}[k]w \mid \sigma^2)} \quad \text{[Equation 3]}$$

$$L_{k,\lambda}^{CGG}(y[k], \hat{H}[k]) = \ln \frac{\sum_{w \in A_0^{\lambda}} f_z(y[k] - \hat{H}[k]w \mid \alpha, \beta)}{\sum_{w \in A_1^{\lambda}} f_z(y[k] - \hat{H}[k]w \mid \alpha, \beta)} \quad \text{[Equation 4]}$$

Equation 3 indicates a process of calculating an LLR in a case that a Gaussian PDF is applied to the RE group #1, and Equation 4 indicates a process of calculating an LLR in a case that a CGG PDF is applied to the RE group #1. That is, $L_{k,\lambda}^{G}(y[k],\hat{H}[k])$ denotes the LLR calculated in the case that the Gaussian PDF is applied to the RE group #1, and $L_{k,\lambda}^{CGG}(y[k],\hat{H}[k])$ denotes the LLR calculated in the case that the CGG PDF is applied to the RE group #1.

The Gaussian PDF may be expressed as Equation 5.

$$f_z(\hat{z}[k] \mid \sigma^2) = \frac{1}{\pi\sigma^2}\exp\left(-\frac{|\hat{z}[k]|^2}{\sigma^2}\right) \quad \text{[Equation 5]}$$

The CGG PDF may be expressed as Equation 6.

$$f_z(\hat{z}[k] \mid \alpha, \beta) = \frac{\alpha}{2\pi\beta^2 \Gamma(2/\alpha)} \exp\left(-\left(\frac{|\hat{z}[k]|}{\beta}\right)^\alpha\right) \quad \text{[Equation 6]}$$

The LLR calculating scheme as described above may be simply expanded to a likelihood vector for a non-binary channel code.

Meanwhile, an RE grouping process in a communication system according to an embodiment of the present disclosure will be described below.

An example of a process of performing an RE grouping process in a signal receiving apparatus in a communication system supporting an OFDMA scheme according to an embodiment of the present disclosure will be described with reference to FIGS. 8A and 8B.

Figure 8A:
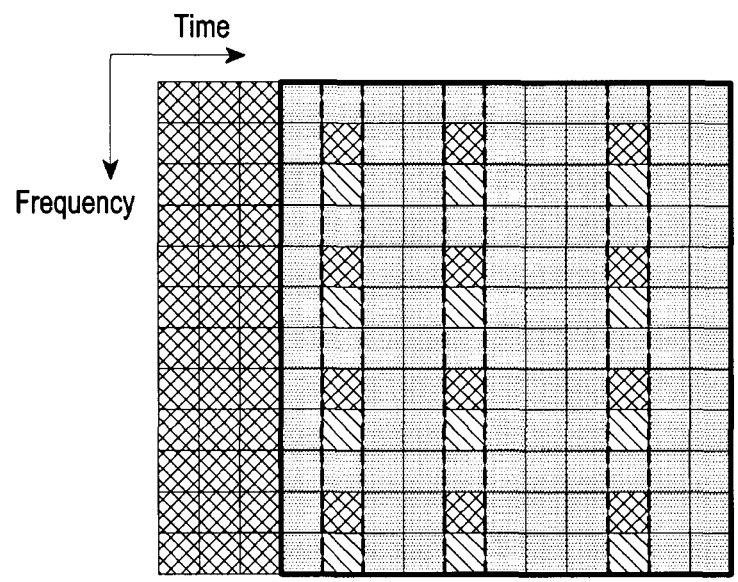
FIGS. 8A and 8B schematically illustrate an example of a process of performing an RE grouping process in a signal receiving apparatus in a communication system supporting an OFDMA scheme according to an embodiment of the present disclosure.
Figure 8B:
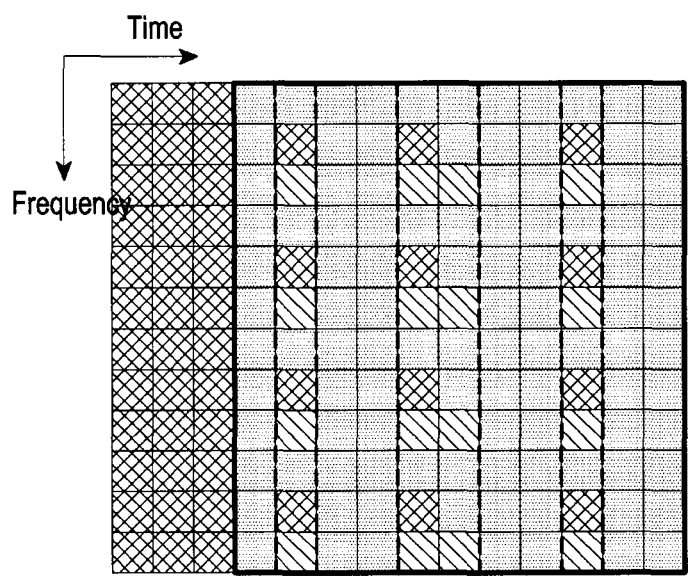

FIGS. 8A and 8B schematically illustrate an example of a process of performing an RE grouping process in a signal receiving apparatus in a communication system supporting an OFDMA scheme according to an embodiment of the present disclosure.

Referring to FIGS. 8A and 8B, it will be noted that a process of performing an RE grouping process in a signal receiving apparatus as shown in FIG. 8 is a process of performing an RE grouping process based on the number of CRS ports.

If the communication system supporting the OFDMA scheme is, for example, an LTE mobile communication system, information about the number of CRS ports for an interference CRS signal is provided to a signal receiving apparatus, e.g., a UE. So, the signal receiving apparatus may generate REs which may be affected by a CRS as a separate RE group based on the information about the number of CRS ports. For example, in an LTE mobile communication system supporting a Release 12 LTE standard, a base station provides UE with information about the number of CRS ports for an interference CRS signal.

A RE grouping process in a case that a maximum value of the number of CRS ports for an interference CRS signal is 1 or 2 is shown in FIG. 8A.

A RE grouping process in a case that a maximum value of the number of CRS ports for an interference CRS signal is 4 is shown in FIG. 8B.

In a communication system supporting an OFDMA scheme according to an embodiment of the present disclosure, information about the number of CRS ports for an interference CRS signal is not provided to a signal receiving apparatus, e.g., a UE, the signal receiving apparatus performs an RE grouping process on an assumption that the number of CRS ports for the interference CRS signal is 2 or 4. Even though the signal receiving apparatus performs the RE grouping process on the assumption that the number of CRS ports for the interference CRS signal is 4, performance degradation hardly occurs.

An example of a process of performing an RE grouping process in a signal receiving apparatus in a communication system supporting an OFDMA scheme according to an embodiment of the present disclosure has been described with reference to FIGS. 8A and 8B, and another example of a process of performing an RE grouping process in a signal receiving apparatus in a communication system supporting an OFDMA scheme according to an embodiment of the present disclosure will be described with reference to FIGS. 9A to 9C.

Figure 9A:
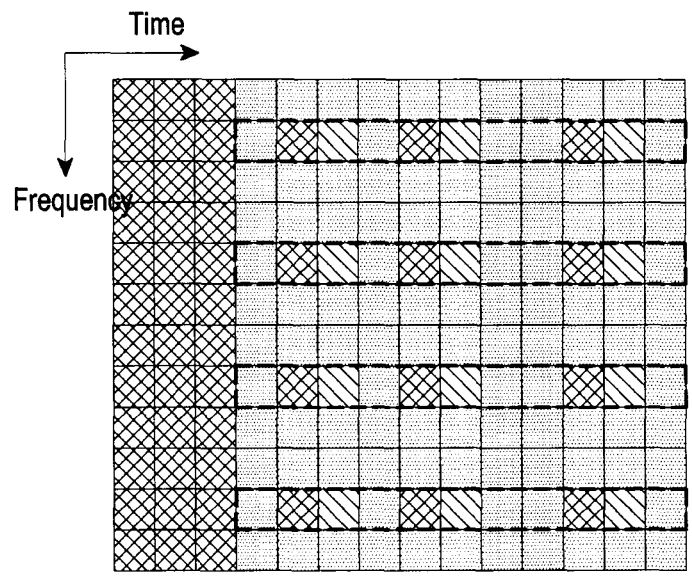
FIGS. 9A to 9C schematically illustrate another example of a process of performing an RE grouping process in a signal receiving apparatus in a communication system supporting an OFDMA scheme according to an embodiment of the present disclosure.
Figure 9B:
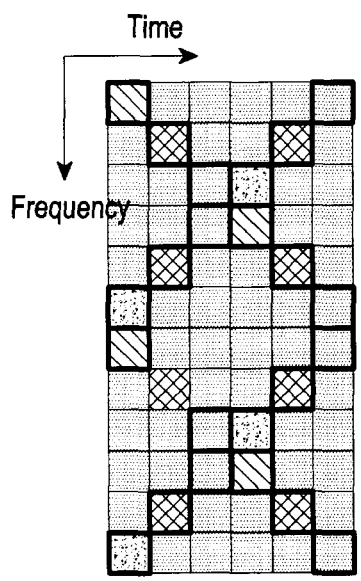
Figure 9C:
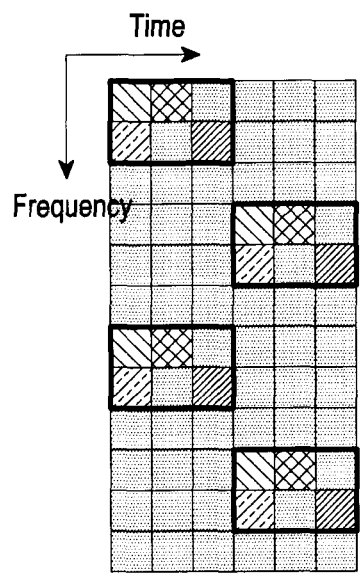

FIGS. 9A to 9C schematically illustrate another example of a process of performing an RE grouping process in a signal receiving apparatus in a communication system supporting an OFDMA scheme according to an embodiment of the present disclosure.

Referring to FIGS. 9A to 9C, it will be noted that a process of performing an RE grouping process by a signal receiving apparatus as shown in FIGS. 9A to 9C is a process of performing an RE grouping process by a signal receiving apparatus in a case that each cell changes location of an RE through which a reference signal, e.g., a pilot signal is transmitted on a time axis.

In most standards supporting an OFDMA scheme such as an LTE, location at which reference signals are transmitted is set such that collision among reference signals, e.g., pilot signals does not occur among neighbor cells, an embodiment of the present disclosure assumes a case that each cell changes location of an RE at which a reference signal is transmitted on a time axis.

So, an embodiment of the present disclosure may generate an RE group which may be affected by the reference signal with various forms as shown as FIGS. 9A to 9C.

Another example of a process of performing an RE grouping process in a signal receiving apparatus in a communication system supporting an OFDMA scheme according to an embodiment of the present disclosure has been described with reference to FIGS. 9A to 9C, and still another example of a process of performing an RE grouping process in a signal receiving apparatus in a communication system supporting an OFDMA scheme according to an embodiment of the present disclosure will be described with reference to FIG. 10.

Figure 10:
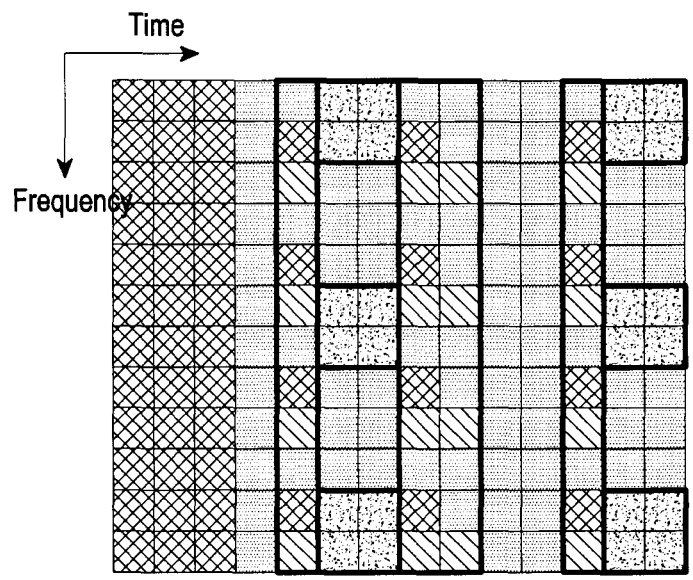
FIG. 10 schematically illustrates still another example of a process of performing an RE grouping process in a signal receiving apparatus in a communication system supporting an OFDMA scheme according to an embodiment of the present disclosure.

FIG. 10 schematically illustrates still another example of a process of performing an RE grouping process in a signal receiving apparatus in a communication system supporting an OFDMA scheme according to an embodiment of the present disclosure.

Referring to FIG. 10, it will be noted that a process of performing an RE grouping process in a signal receiving apparatus as shown in FIG. 10 is a process of performing an RE grouping process in a signal receiving apparatus in a case that a transmission mode (TM) in which a demodulation reference signal (DM-RS) is transmitted is included in an interference signal.

If the communication system supporting the OFDMA scheme is, for example, an LTE mobile communication system, information related to an interference signal is provided to a signal receiving apparatus, e.g., a UE. So, the signal receiving apparatus may know information about the TM in which the DM-RS is transmitted. The information related to the interference signal provided in the LTE mobile communication system will be described below, and a detailed description thereof will be omitted herein.

So, in an embodiment of the present disclosure, an RE group which may be affected by the reference signal may be generated based on a TM in which a DM-RS is transmitted as shown in FIG. 10.

Meanwhile, if a TM in which a DM-RS is transmitted is not included in an interference signal, a signal receiving apparatus may perform an RE grouping process based on an RE grouping process as described in FIGS. 8A and 8B, i.e., an RE grouping process which is based on the number of CRS ports. This RE grouping process may be performed if there is a case that a DM-RS affects an RE through which a target data signal is transmitted, and the signal receiving apparatus performs an RE grouping process based on location of an interference CRS and location at which the DM-RS is transmitted.

Still another example of a process of performing an RE grouping process in a signal receiving apparatus in a communication system supporting an OFDMA scheme according to an embodiment of the present disclosure has been described with reference to FIG. 10, and still another example of a process of performing an RE grouping process in a signal receiving apparatus in a communication system supporting an OFDMA scheme according to an embodiment of the present disclosure will be described with reference to FIG. 11.

Figure 11:
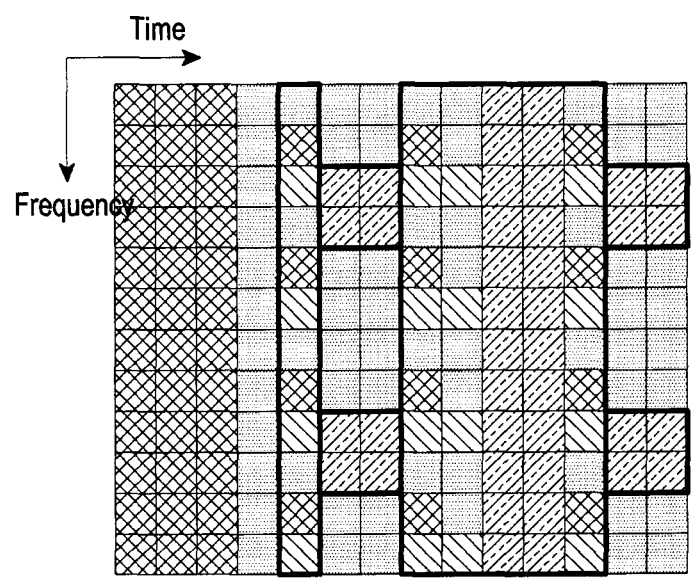
FIG. 11 schematically illustrates still another example of a process of performing an RE grouping process in a signal receiving apparatus in a communication system supporting an OFDMA scheme according to an embodiment of the present disclosure.

FIG. 11 schematically illustrates still another example of a process of performing an RE grouping process in a signal receiving apparatus in a communication system supporting an OFDMA scheme according to an embodiment of the present disclosure.

Referring to FIG. 11, it will be noted that a process of performing an RE grouping process in a signal receiving apparatus as shown in FIG. 10 is a process of performing an RE grouping process in a signal receiving apparatus in a case that a TM in which a channel state information reference signal (CSI-RS) is transmitted is included in an interference signal.

If the communication system supporting the OFDMA scheme is, for example, an LTE mobile communication system, information related to an interference signal is provided to a signal receiving apparatus, e.g., a UE. So, the signal receiving apparatus may know information about the TM in which the CSI-RS is transmitted.

So, in an embodiment of the present disclosure, an RE group which may be affected by the reference signal may be generated based on a TM in which a CSI-RS is transmitted as shown in FIG. 11.

Still another example of a process of performing an RE grouping process in a signal receiving apparatus in a communication system supporting an OFDMA scheme according to an embodiment of the present disclosure has been described with reference to FIG. 11, and still another example of a process of performing an RE grouping process in a signal receiving apparatus in a communication system supporting an OFDMA scheme according to an embodiment of the present disclosure will be described with reference to FIG. 12.

Figure 12:
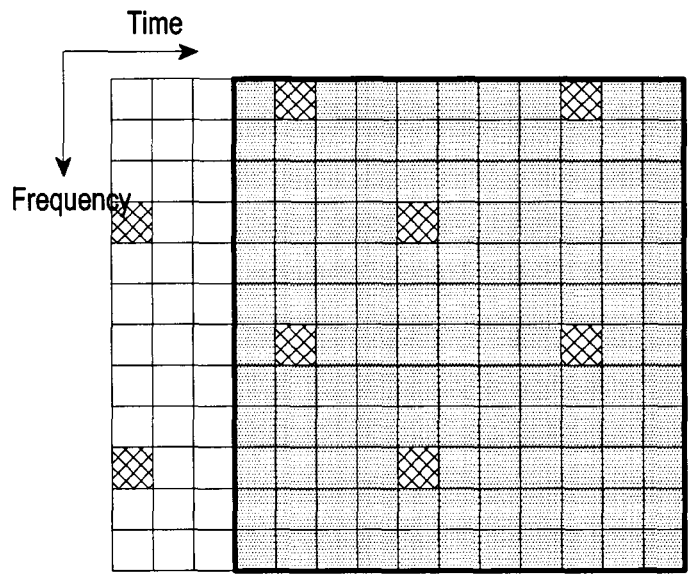
FIG. 12 schematically illustrates still another example of a process of performing an RE grouping process in a signal receiving apparatus in a communication system supporting an OFDMA scheme according to an embodiment of the present disclosure.

FIG. 12 schematically illustrates still another example of a process of performing an RE grouping process in a signal receiving apparatus in a communication system supporting an OFDMA scheme according to an embodiment of the present disclosure.

Referring to FIG. 12, it will be assumed that a communications system supporting an OFDMA scheme is an LTE mobile communication system. Further, a signal receiving apparatus, e.g., a UE may receive information related to an interference signal form a signal transmitting apparatus, e.g., a base station.

The UE receives information related to an interference signal, e.g., a RadioResourceConfigDedicated information element (IE) from a base station.

The RadioResourceConfigDedicated IE includes various fields, particularly, in an embodiment of the present disclosure, an RE group is generated based on a NeighCellsInfo-r12 field among the fields included in the RadioResourceConfigDedicated IE. The NeighCellsInfo-r12 field may be expressed as Table 1.

TABLE 1

| NeighCellsInfo-r12 ::= | SEQUENCE { | |
|---|---|---|
| physCellId-r12 | PhysCellId, | |
| p-b-r12 | INTEGER (0..3), | |
| crs-PortsCount-r12 | ENUMERATED {n1, n2, n4, spare}, | |
| mbsfn-SubframeConfig-r12 | MBSFN-SubframeConfigList | OPTIONAL, -- Need ON |
| p-aList-r12 | SEQUENCE (SIZE (1..maxP-a-PerNeighCell-r12)) OF P-a, | |
| transmissionModeList-r12 | BIT STRING (SIZE (8)), | |
| resAllocGranularity-r12 | INTEGER (1..4), | |
| ... | | |
| } | | |

In Table 1, the NeighCellsInfo-r12 field includes secondary information which is used by a UE thereby interference of a neighbor cell is canceled and suppressed. If the NeighCellsInfo-r12 field exists for a neighbor cell, the UE assumes that transmission parameters listed in sub-fields included in the NeighCellsInfo-r12 field are used by the neighbor cell. If the NeighCellsInfo-r12 field exists for a neighbor cell, the UE assumes that the neighbor cell has a sub-frame and a system frame number (SFN) which are synchronized with a serving cell, a system bandwidth which is equal to a system bandwidth of the serving cell, a uplink/downlink sub-frame configuration and a specific sub-frame configuration which are identical to a uplink/downlink sub-frame configuration and a specific sub-frame configuration of the serving cell, and a cyclic prefix length which is equal to a cyclic prefix length of the serving cell.

In Table 1, physCellId-r12 indicates a cell ID of a neighbor cell. In the LTE mobile communication system, a CRS is shifted by a preset offset value on a frequency axis according to a cell ID. Here, the offset value applied to the corresponding CRS which is based on the cell ID may be expressed as Equation 7.

$$v_{shift}=\mod(\text{Cell ID},6) \quad [\text{Equation 7}]$$

In Equation 7, vshift denotes an offset value applied to a corresponding CRS, and denotes an offset on a frequency axis which is based on a preset reference CRS. In Equation 7, mod denotes a modulo calculation, and a Cell ID denotes a cell ID of a corresponding cell.

For example, if the cell ID of the corresponding cell is 100, vshift is 4, and, if the number of CRS ports is 1, a CRS as shown in FIG. 12 is transmitted.

Meanwhile, crs-PortsCount-r12 among sub-fields included in the NeighCellsInfo-r12 field among fields included in the RadioResourceConfigDedicated IE indicates the number of CRS ports of a neighbor cell. A CRS structure according to the number of CRS ports will be described with reference to FIGS. 13 to 15, and a detailed description will be omitted herein.

So, CRS location for the interference signal transmitted in the corresponding cell may be detected based on the phys-CellId-r12 and crs-PortsCount-r12.

A process of performing an RE grouping process in a UE as shown in FIG. 12 will be described with reference to, for example, a release 12 (Rel. 12) LTE mobile communication system.

In a Rel. 12 LTE mobile communication system, a RadioResourceConfigDedicated IE may include up to 8 NeighCellsInfo-r12 fields. So, if a base station transmits a RadioResourceConfigDedicated IE including 8 NeighCellsInfo-r12 fields, the UE may acquire location information for 8 CRSs.

So, the UE generates REs in which there is no possibility of being affected by an interference CRS as an RE group #1 and generates REs in which there is a possibility of being affected by the interference CRS as an RE group #2 based on location information for the acquired 8 CRSs.

Still another example of a process of performing an RE grouping process in a signal receiving apparatus in a communication system supporting an OFDMA scheme according to an embodiment of the present disclosure has been described with reference to FIG. 12, and an example of a CRS structure according to the number of CRS ports in a communication system supporting an OFDMA scheme according to an embodiment of the present disclosure will be described with reference to FIG. 13.

Figure 13:
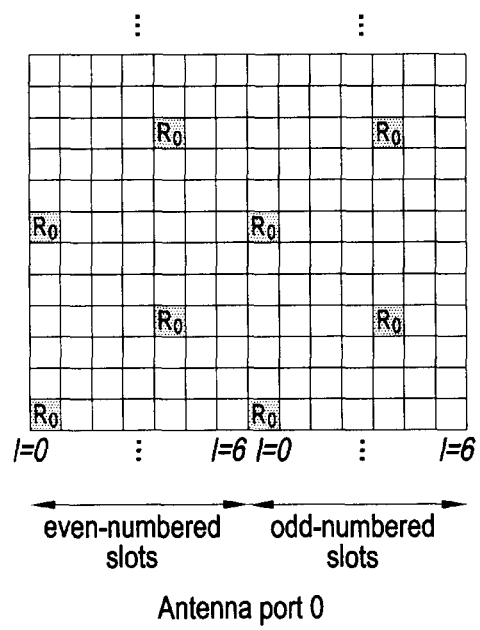
FIG. 13 schematically illustrates an example of a CRS structure according to the number of CRS ports in a communication system supporting an OFDMA scheme according to an embodiment of the present disclosure.

FIG. 13 schematically illustrates an example of a CRS structure according to the number of CRS ports in a communication system supporting an OFDMA scheme according to an embodiment of the present disclosure.

Referring to FIG. 13, a CRS structure according to the number of CRS ports as shown in FIG. 13 indicates a CRS structure according to the number of CRS ports in a case that one antenna port is used. Further, the CRS structure according to the number of CRS ports as shown in FIG. 13 indicates a CRS structure according to the number of CRS ports in a case that the number of CRS ports is 1.

An example of a CRS structure according to the number of CRS ports in a communication system supporting an OFDMA scheme according to an embodiment of the present disclosure has been described with reference to FIG. 13, and another example of a CRS structure according to the number of CRS ports in a communication system supporting an OFDMA scheme according to an embodiment of the present disclosure will be described with reference to FIG. 14.

Figure 14:
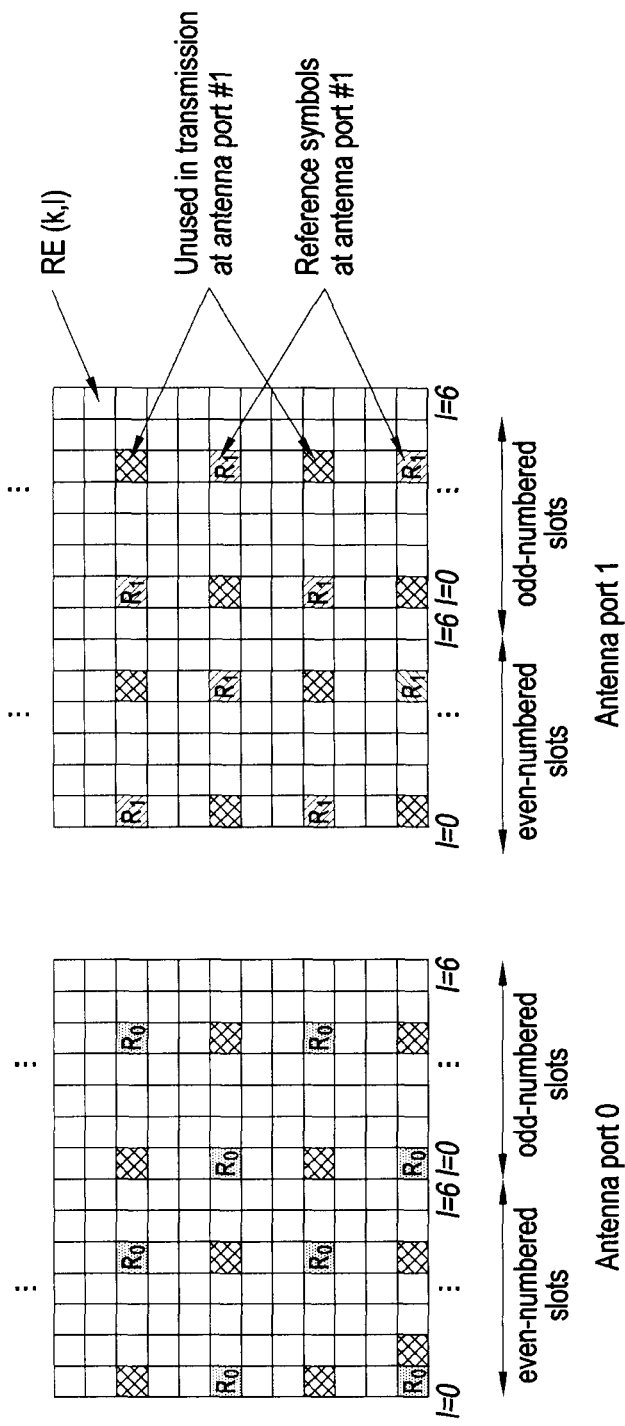
FIG. 14 schematically illustrates another example of a CRS structure according to the number of CRS ports in a communication system supporting an OFDMA scheme according to an embodiment of the present disclosure.

FIG. 14 schematically illustrates another example of a CRS structure according to the number of CRS ports in a communication system supporting an OFDMA scheme according to an embodiment of the present disclosure.

Referring to FIG. 14, a CRS structure according to the number of CRS ports as shown in FIG. 14 indicates a CRS structure according to the number of CRS ports in a case that two antenna ports are used. Further, the CRS structure according to the number of CRS ports as shown in FIG. 14 indicates a CRS structure according to the number of CRS ports in a case that the number of CRS ports is 2.

Another example of a CRS structure according to the number of CRS ports in a communication system supporting an OFDMA scheme according to an embodiment of the present disclosure has been described with reference to FIG. 14, and still another example of a CRS structure according to the number of CRS ports in a communication system supporting an OFDMA scheme according to an embodiment of the present disclosure will be described with reference to FIG. 15.

Figure 15:
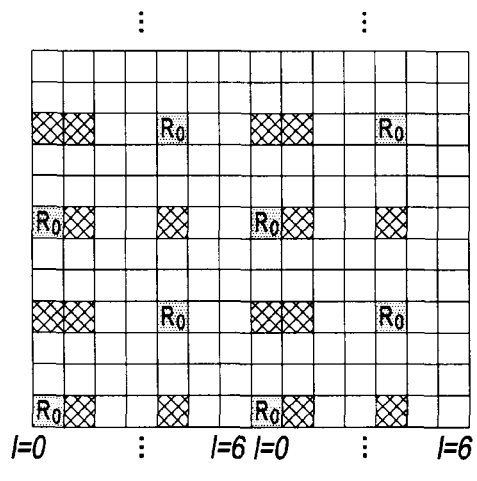
FIG. 15 schematically illustrates still another example of a CRS structure according to the number of CRS ports in a communication system supporting an OFDMA scheme according to an embodiment of the present disclosure.
Figure 15:
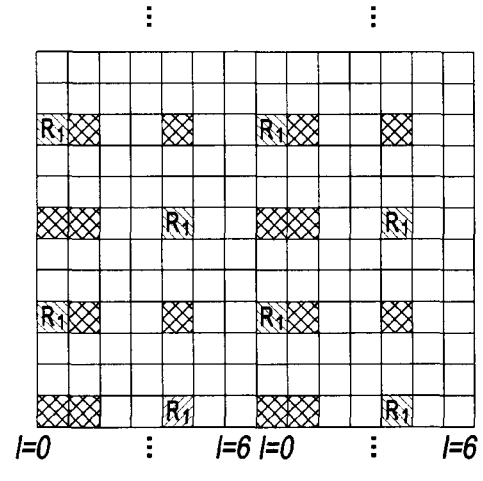
Figure 15:
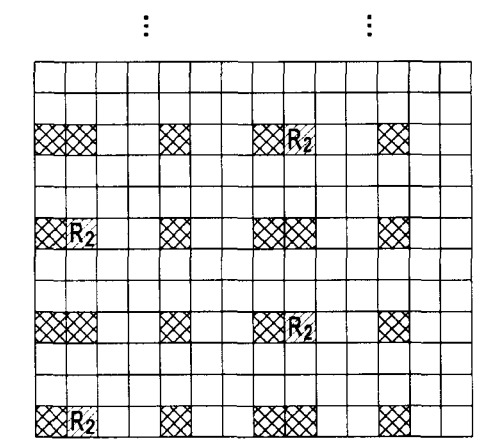
Figure 15:
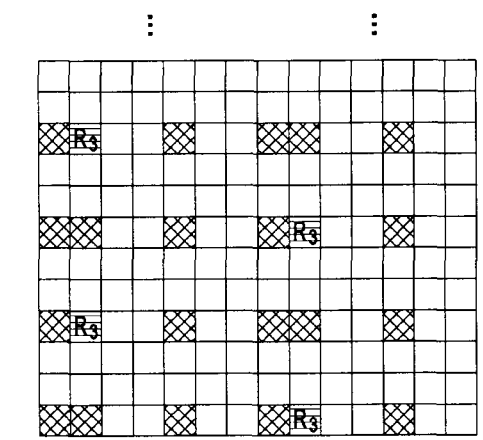

FIG. 15 schematically illustrates still another example of a CRS structure according to the number of CRS ports in a communication system supporting an OFDMA scheme according to an embodiment of the present disclosure.

Referring to FIG. 15, a CRS structure according to the number of CRS ports as shown in FIG. 15 indicates a CRS structure according to the number of CRS ports in a case that four antenna ports are used. Further, the CRS structure according to the number of CRS ports as shown in FIG. 15 indicates a CRS structure according to the number of CRS ports in a case that the number of CRS ports is 4.

Still another example of a CRS structure according to the number of CRS ports in a communication system supporting an OFDMA scheme according to an embodiment of the present disclosure has been described with reference to FIG. 15, and still another example of a process of performing an RE grouping process in a signal receiving apparatus in a communication system supporting an OFDMA scheme according to an embodiment of the present disclosure will be described with reference to FIG. 16.

Figure 16:
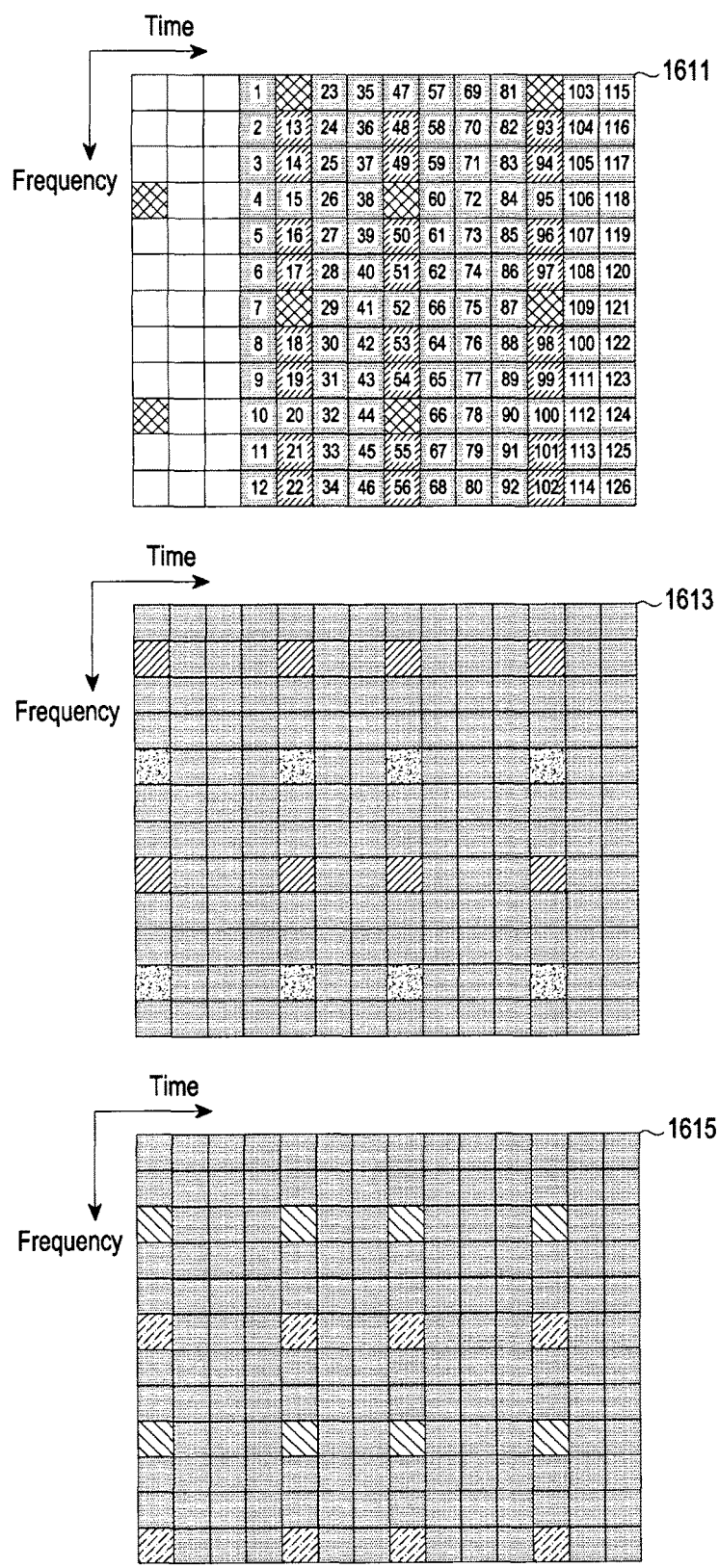
FIG. 16 schematically illustrates still another example of a process of performing an RE grouping process in a signal receiving apparatus in a communication system supporting an OFDMA scheme according to an embodiment of the present disclosure.

FIG. 16 schematically illustrates still another example of a process of performing an RE grouping process in a signal receiving apparatus in a communication system supporting an OFDMA scheme according to an embodiment of the present disclosure.

Referring to FIG. 16, it will be assumed that a target signal, i.e., a target CRS 1611 is a target signal in a case that a Cell ID is 100, the number of CRS ports is 1, and the number of orthogonal frequency division multiplexing (OFDM) symbols allocated to a physical downlink control channel (PDCCH) is 3. Here, information about the target signal may be acquired through a physical control format indicator channel (PCFICH).

It will be assumed that there are two interference signals, i.e., two interference CRSs, i.e., an interference CRS 1613 received from a neighbor cell of which a cell ID is 101 and a CRS 1615 received from a neighbor cell of which a cell ID is 105. Here, the interference CRS 1613 is a CRS in a case that a field value of a physCellId-r12 field included in a NeighCellsInfo-r12 is 101, and a field value of a crs-PortsCount-r12 sub-field included in the physCellId-r12 field is 2 (physCellId-r12=[101], crs-PortsCount-r12=[2]). Here, the interference CRS 1615 is a CRS in a case that a field value of a physCellId-r12 field included in a NeighCellsInfo-r12 is 105, and a field value of a crs-PortsCount-r12 sub-field included in the physCellId-r12 field is 2 (physCellId-r12=[105], crs-PortsCount-r12=[2]).

So, a UE which is based on the target CRS 1611, the interference CRS 1613, and the interference CRS 165 may generate an RE group#1 as a group including REs in which there is no possibility of being affected by the interference CRS 1613 and the interference CRS 165 and an RE group#2 as a group including REs in which there is a possibility of being affected by the interference CRS 1613 and the interference CRS 165.

As shown in FIG. 16, in a case of being based on the target CRS 1611, the interference CRS 1613, and the interference CRS 165, REs#1 to #12, an RE#15, an RE#20, REs#23 to #47, an RE#52, REs#57 to #92, an RE#95, an RE#100, and REs#103 to #126 among total 126 REs from REs#1 to #126 are included in the RE group#1.

In a case of being based on the target CRS 1611, the interference CRS 1613, and the interference CRS 165, an RE#13, an RE#14, an RE#16, an RE#17, an RE#18, an RE#19, an RE#21, an RE#22, an RE#48, an RE#49, an RE#50, an RE#51, an RE#53, an RE#54, an RE#55, an RE#56, an RE#93, an RE#94, an RE#96, an RE#97, an RE#98, an RE#99, an RE#101, and an RE#102 among the total 126 REs from the REs#1 to #126 are included in the RE group#2.

Still another example of a process of performing an RE grouping process in a signal receiving apparatus in a communication system supporting an OFDMA scheme according to an embodiment of the present disclosure has been described with reference to FIG. 16, and still another example of a process of performing an RE grouping process in a signal receiving apparatus in a communication system supporting an OFDMA scheme according to an embodiment of the present disclosure will be described with reference to FIG. 17.

Figures 17, 18:
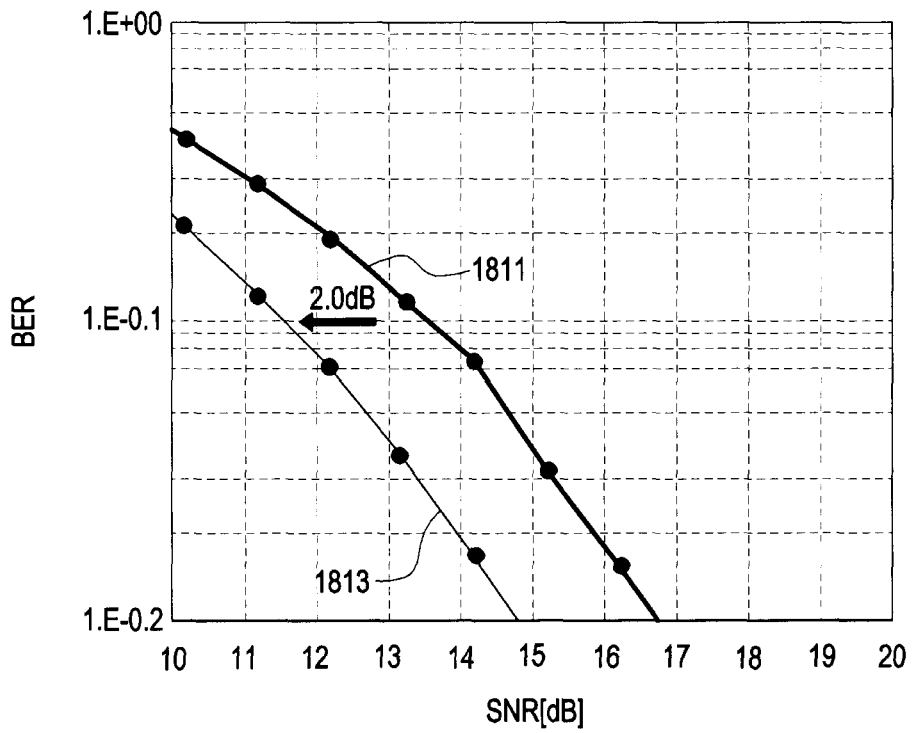
FIG. 17 schematically illustrates still another example of a process of performing an RE grouping process in a signal receiving apparatus in a communication system supporting an OFDMA scheme according to an embodiment of the present disclosure.
FIG. 18 schematically illustrates performance in a case that an RE grouping process is applied in a communication system supporting an OFDMA scheme according to an embodiment of the present disclosure.

FIG. 17 schematically illustrates still another example of a process of performing an RE grouping process in a signal receiving apparatus in a communication system supporting an OFDMA scheme according to an embodiment of the present disclosure.

Referring to FIG. 17, a signal receiving apparatus, e.g., a UE may identify an RE which is affected by an interference CRS based on CRS location. So, the signal receiving apparatus may generate an RE group, i.e., an RE group #2 such that all REs which are affected by an interference CRS are included in the RE group.

Firstly, it will be assumed that a target signal is a target signal in a case that a cell ID is 100, the number of CRS ports is 1, and the number of OFDM symbols allocated to a PDCCH is 3. Here, information about the target signal may be acquired through a PCFICH.

In this case, REs included in an RE group #1 including REs which are not affected by a boosted interference signal are REs#1 to #12, REs #23 to #46, REs#69 to #92, and REs#103 to #126.

Further, REs included in an RE group #2 including REs which are affected by a boosted interference signal are REs#13 to #22, REs #47 to #68, and REs#93 to #102.

Still another example of a process of performing an RE grouping process in a signal receiving apparatus in a communication system supporting an OFDMA scheme according to an embodiment of the present disclosure has been described with reference to FIG. 17, and performance in a case that an RE grouping process is applied in a communication system supporting an OFDMA scheme according to an embodiment of the present disclosure will be described with reference to FIG. 18.

FIG. 18 schematically illustrates performance in a case that an RE grouping process is applied in a communication system supporting an OFDMA scheme according to an embodiment of the present disclosure.

Referring to FIG. 18, it will be understood that performance 1813 in a case that an RE grouping process according to an embodiment of the present disclosure is applied is improved by about 2 [dB] compared to performance 1811 in a case that the RE grouping process according to an embodiment of the present disclosure is not applied.

Performance in a case that an RE grouping process is applied in a communication system supporting an OFDMA scheme according to an embodiment of the present disclosure has been described with reference to FIG. 18, and examples of an inner structure of a signal receiving apparatus in a communication system supporting an OFDMA scheme according to an embodiment of the present disclosure will be described with reference to FIGS. 19 to 22.

Prior to description of FIGS. 19 to 22, variables and computations used in FIGS. 19 to 22 will be defined as the following.

(1) $Y_k$ $Y_k$ denotes the kth received symbol vector.

(2) $Y_i[k]$ $Y_i[k]$ denotes the kth symbol received through the ith reception antenna.

(3) $\tilde{Y}_k$ $\tilde{Y}_k$ denotes an output value of a CRS-interference cancellation (IC) unit for $Y_k$.

(4) $\tilde{Y}_i[k]$ $\tilde{Y}_i[k]$ denotes an output value of a CRS-IC unit for $Y_i[k]$.

(5) $R[k]$ $R[k]$ denotes an output value of a minimum mean square error-interference rejection combining (MMSE-IRC) unit for $\tilde{Y}_k$.

(6) $\hat{H}_k$ $\hat{H}_k$ denotes a fading channel estimation vector for the kth received symbol.

(7) $\hat{H}_{ij}[k]$ $\hat{H}_{ij}[k]$ denotes a fading channel estimation vector between the jth transmission antenna and the ith reception antenna for the kth received symbol.

(8) $s[k]$ $s[k]$ denotes the kth transmission symbol.

(9) nk nk denotes a noise component vector of the kth received symbol.

(10) $ni[k]$ $ni[k]$ denotes a noise component of the kth received symbol received through the ith reception antenna.

(11) $\tilde{\sigma}_i^2$ $\tilde{\sigma}_i^2$ denotes noise variance estimated from $\tilde{Y}_i[k]$.

(12) $A_i^\lambda$ $A_i^\lambda$ denotes a set of candidate modulation symbols of which the λth bit is i.

(13) $A_0 \cup A_1$ $A_0 \cup A_1$ denotes a set of all candidate modulation symbols.

(14) $CN(a,b)$ $CN(a,b)$ denotes a complex Gaussian random variable of which mean is a and variance is b.

(15) $(a)^H$ $(a)^H$ denotes Hermitian (conjugate transpose) calculation of a.

(16) $E\{a\}$ $E\{a\}$ denotes calculation of calculating mean of a.

Prior to description of FIGS. 19 to 22, it will be noted that Equations used in FIGS. 19 to 22 are generated on an assumption that the number of transmission antennas is 1, and the number of reception antennas is 2. That is, if the number of transmission antennas is greater than 1, or the number of reception antennas is 1 or greater than 2, Equations used in FIGS. 19 to 22 may be modified corresponding to this.

Another example of an inner structure of a signal receiving apparatus in a communication system supporting an OFDMA scheme according to an embodiment of the present disclosure will be described with reference to FIG. 19.

Figure 19:
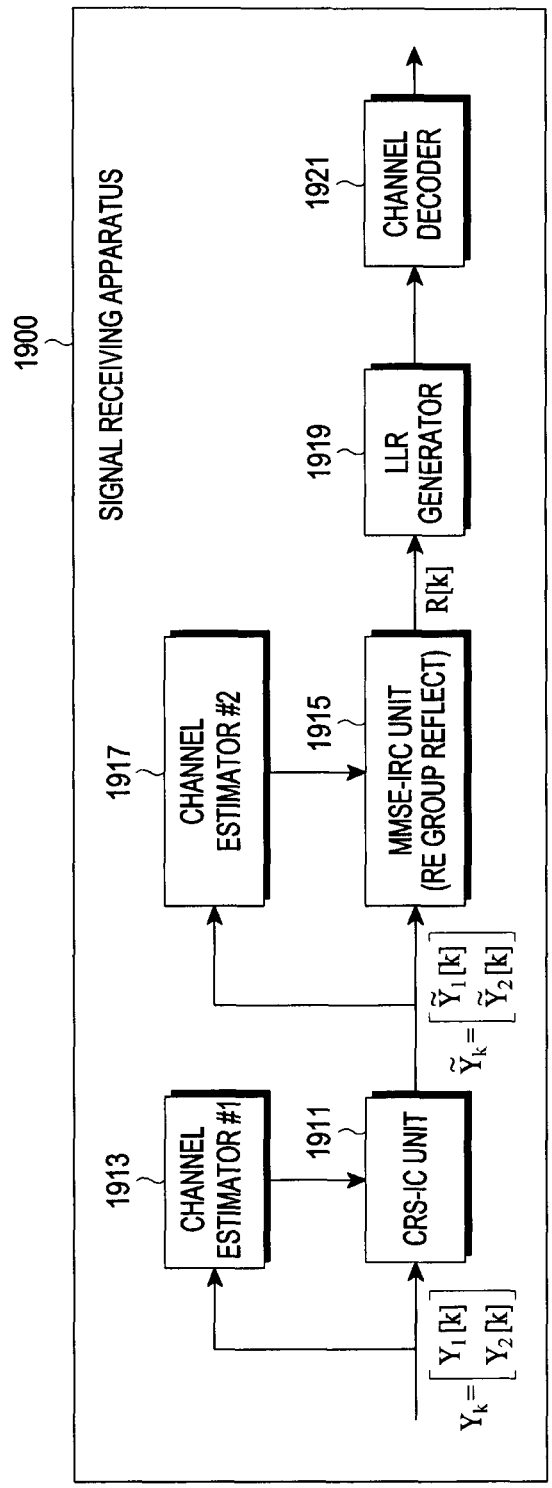
FIG. 19 schematically illustrates another example of an inner structure of a signal receiving apparatus in a communication system supporting an OFDMA scheme according to an embodiment of the present disclosure.

FIG. 19 schematically illustrates another example of an inner structure of a signal receiving apparatus in a communication system supporting an OFDMA scheme according to an embodiment of the present disclosure.

Referring to FIG. 19, a signal receiving apparatus 1900 may be, for example, a UE, and includes a CRS-interference cancellation (IC) unit 1911, a channel estimator #1 1913, a minimum mean square error-interference rejection combining (MMSE-IRC) unit 1915, a channel estimator #2 1917, an LLR generator 1919, and a channel decoder 1921.

Firstly, $Y_k$ as the kth received symbol vector is inputted to each of the CRS-IC unit 1911 and the channel estimator #1 1913. Here, $Y_k$ may be expressed as Equation 8.

$$Y_k = \begin{bmatrix} Y_1[k] \\ Y_2[k] \end{bmatrix} \quad \text{[Equation 8]}$$

The channel estimator #1 1913 estimates a channel based on $Y_k$ to generate a channel estimation value, e.g., a channel estimation value in which ICI is considered, and outputs the channel estimation value to the CRS-IC unit 1911.

The CRS-IC unit 1911 performs a CRC-IC operation based on $Y_k$ and the channel estimation value outputted from the channel estimator #1 1913 to generate a result value $\tilde{Y}_k$, and outputs the result value $\tilde{Y}_k$ to each of the MMSE-IRC unit 1915 and the channel estimator #2 1917.

Here, $\tilde{Y}_k$ may be expressed as Equation 9.

$$\tilde{Y}_k = \begin{bmatrix} \tilde{Y}_1[k] \\ \tilde{Y}_2[k] \end{bmatrix} \quad \text{[Equation 9]}$$

The channel estimator #2 1917 estimates a channel based on $\tilde{Y}_k$ outputted from the CRS-IC unit 1911 to generate a channel estimation value, e.g., a channel estimation value in which a target signal is considered, and outputs the channel estimation value to the MMSE-IRC unit 1915.

The MMSE-IRC unit 1915 performs an MMSE-IRC operation based on $\tilde{Y}_k$ outputted from the CRS-IC unit 1911 and the channel estimation value outputted from the channel estimator #2 1917 to generate a result value R[k], and outputs the result value R[k] to the LLR generator 1919. R[k] may be expressed as Equation 10.

$$R[k] = W_k \tilde{Y}_k = a[k]s[k] + \mu[k] \quad \text{[Equation 10]}$$

where $$W_k = \hat{H}_k^H \left( \hat{H}_k \hat{H}_k^H + \text{Cov}(\eta)_{Group\ index}^{RB\ index} \right)^{-1} = [w_1[k] \quad w_2[k]]$$

$$\hat{H}_k = \begin{bmatrix} \hat{H}_{11}[k] \\ \hat{H}_{21}[k] \end{bmatrix}, \eta_k = \begin{bmatrix} \min_{s \in A_0 \cup A_1} |\tilde{Y}_1[k] - \hat{H}_{11}[k]s|^2 \\ \min_{s \in A_0 \cup A_1} |\tilde{Y}_2[k] - \hat{H}_{21}[k]s|^2 \end{bmatrix},$$

$$\text{Cov}(\eta)_{Group\ index}^{RB\ index} = \frac{1}{N_{Group\ index}^{RB\ index}} \sum_{k \in V_{Group\ index}^{RB\ index}} \eta_k (\eta_k)^H$$

$$\mu \sim CN(0, (w_1[k])^2 \tilde{\sigma}_1^2 + (w_2[k])^2 \tilde{\sigma}_2^2),$$

$$a[k] = w_1[k]\hat{H}_{11}[k] + w_2[k]\hat{H}_{21}[k],$$

$$\mu[k] = w_1[k]n_1[k] + w_2[k]n_2[k]$$

In Equation 10, $\text{Cov}(a)_{Group\ index}^{RB\ index}$ denotes a computation for calculating a variation matrix using samples within a given group index and RB index. In Equation 10, $\eta k$ denotes a noise vector value estimated from $\tilde{Y}_k$. In Equation 10, $N_{Group\ index}^{RB\ index}$ denotes the number of RE samples within the given group index and RB index. In Equation 10, $V_{Group\ index}^{RB\ index}$ denotes a set of RE indexes within the given group index and RB index.

Further, it will be noted that R[k] as expressed in Equation 10 is R[k] in a case of single input multi-output (SIMO) (a case that the number of transmission antennas is 1 and the number of reception antennas is 2).

The MMSE-IRC unit 1915 performs a variation matrix of noise per RE group, and uses a data RE upon performing noise variation estimating operation. So, the signal receiving apparatus 1900 needs to perform a hard decision operation on a received signal.

The LLR generator 1919 generates an LLR based on R[k] outputted from the MMSE-IRC unit 1915 and outputs the generated LLR to the channel decoder 1921. Here, the LLR may be expressed as Equation 11.

$$L_{k,\lambda}^G(R[k], a[k]) \approx \quad \text{[Equation 11]}$$

$$\frac{1}{\sigma_k^2} \left\{ \min_{s \in A_0^\lambda} |R[k] - a[k]s|^2 - \min_{s \in A_1^\lambda} |R[k] - a[k]s|^2 \right\}$$

In Equation 11, $\sigma_k^2 = (w_1[k])^2 \tilde{\sigma}_1^2 + (w_2[k])^2 \tilde{\sigma}_2^2$.

The channel decoder 1921 performs a channel decoding operation based on the LLR outputted from the LLR generator 1919.

Although the CRS-IC unit 1911, the channel estimator #1 1913, the MMSE-IRC unit 1915, the channel estimator #2 1917, the LLR generator 1919, and the channel decoder 1921 are described as separate units in the signal receiving apparatus 1900 in FIG. 19, it is to be understood that the signal receiving apparatus 1900 may be implemented with a form into which at least two of the CRS-IC unit 1911, the channel estimator #1 1913, the MMSE-IRC unit 1915, the channel estimator #2 1917, the LLR generator 1919, and the channel decoder 1921 are incorporated. The signal receiving apparatus 1900 may be implemented with one processor. Another example of an inner structure of a signal receiving apparatus in a communication system supporting an OFDMA scheme according to an embodiment of the present disclosure has been described with reference to FIG. 19, and still another example of an inner structure of a signal receiving apparatus in a communication system supporting an OFDMA scheme according to an embodiment of the present disclosure will be described with reference to FIG. 20.

Figure 20:
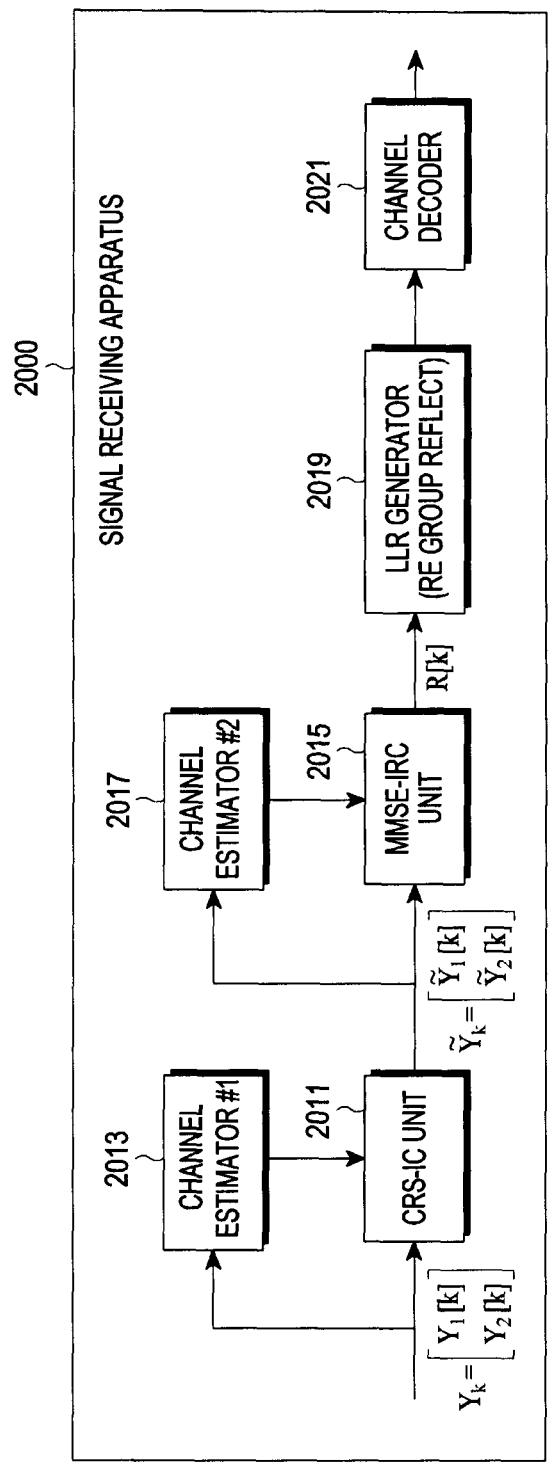
FIG. 20 schematically illustrates still another example of an inner structure of a signal receiving apparatus in a communication system supporting an OFDMA scheme according to an embodiment of the present disclosure.

FIG. 20 schematically illustrates still another example of an inner structure of a signal receiving apparatus in a communication system supporting an OFDMA scheme according to an embodiment of the present disclosure.

Referring to FIG. 20, a signal receiving apparatus 2000 includes a CRS-IC unit 2011, a channel estimator #1 2013, an MMSE-IRC unit 2015, a channel estimator #2 2017, an LLR generator 2019, and a channel decoder 2021.

Firstly, $Y_k$ as the kth received symbol vector is inputted to each of the CRS-IC unit 2011 and the channel estimator #1 2013. Here, $Y_k$ may be expressed as Equation 8.

The channel estimator #1 2013 estimates a channel based on $Y_k$ to generate a channel estimation value, e.g., a channel estimation value in which ICI is considered, and outputs the channel estimation value to the CRS-IC unit 2011.

The CRS-IC unit 2011 performs a CRC-IC operation based on $Y_k$ and the channel estimation value outputted from the channel estimator #1 2013 to generate a result value $\tilde{Y}_k$, and outputs the result value $\tilde{Y}_k$ to each of the MMSE-IRC unit 2015 and the channel estimator #2 2017. Here, $\tilde{Y}_k$ may be expressed as Equation 9.

The channel estimator #2 2017 estimates a channel based on $\tilde{Y}_k$ outputted from the CRS-IC unit 2011 to generate a channel estimation value, e.g., a channel estimation value in which a target signal is considered, and outputs the channel estimation value to the MMSE-IRC unit 2015.

The MMSE-IRC unit 2015 performs an MMSE-IRC operation based on $\tilde{Y}_k$ outputted from the CRS-IC unit 2011 and the channel estimation value outputted from the channel estimator #2 2017 to generate a result value R[k], and outputs the result value R[k] to the LLR generator 2019. R[k] may be expressed as Equation 12.

$$R[k] = W_k \tilde{Y}_k = a[k]s[k] + \mu[k] \quad [\text{Equation 12}]$$

where $$W_k = \hat{H}_k^H \left( \hat{H}_k \hat{H}_k^H + \text{Cov}(n) \right)^{-1} = [w_1[k] \quad w_2[k]]$$

$$\hat{H}_k = \begin{bmatrix} \hat{H}_{11}[k] \\ \hat{H}_{21}[k] \end{bmatrix}, n_k = \begin{bmatrix} n_1[k] \\ n_2[k] \end{bmatrix},$$

$$\text{Cov}(n) = E\{nn^H\} =$$

$$\frac{1}{N_{CRS}} \sum_{k \in CRS_{index}} (\tilde{Y}_k - \hat{H}_k c_k)(\tilde{Y}_k - \hat{H}_k c_k)^H$$

$$\mu \sim CN(0, (w_1[k])^2 \hat{\sigma}_1^2 + (w_2[k])^2 \hat{\sigma}_2^2),$$

$$a[k] = w_1[k] \hat{H}_{11}[k] + w_2[k] \hat{H}_{21}[k],$$

$$\mu[k] = w_1[k] n_1[k] + w_2[k] n_2[k]$$

It will be noted that R[k] as expressed in Equation 12 is R[k] in a case of, for example, SIMO (a case that the number of transmission antennas is 1, and the number of reception antennas is 2). As expressed in Equation 12, the MMSE-IRC unit 2015 may estimate a covariance matrix using only a CRS, so the MMSE-IRC unit 2015 does not need an RB index and a group index. In Equation 12, ck denotes the kth transmitted CRS symbol. In Equation 12, NCRS denotes the number of CRS symbols. In Equation 12, Cov(a) denotes computation of calculating a covariance matrix for a.

The LLR generator 2019 generates an LLR based on R[k] outputted from the MMSE-IRC unit 2015, and outputs the generated LLR to the channel decoder 2021. Here, the LLR may be expressed as Equation 13.

$$L_{k,\lambda}^G(R[k], a[k], RB \text{ index, Group index}) \approx \quad [\text{Equation 13}]$$

$$\frac{1}{(\sigma_{Group\ index}^{RB\ index})^2} \left\{ \min_{s \in A_0^\lambda} |R[k] - a[k]s|^2 - \min_{s \in A_1^\lambda} |R[k] - a[k]s|^2 \right\}$$

In Equation 13, $L_{k,\lambda}^G$(R[k],a[k],RB index,Group index) denotes an LLR for the λth bit for given R[k], a[k], RB index, and Group index. In Equation 13, $\sigma_{Group\ index}^{RB\ index}$ denotes an estimation value of noise variance within the given Group index and RB index. In Equation 13, ck denotes the kth transmitted CRS symbol. In Equation 13, NCRS denotes the number of CRS symbols. In Equation 13, Cov(a) denotes computation of calculating a covariance matrix for a.

The LLR generator 2019 estimates noise variance per RE group for R[k] outputted from the MMSE-IRC unit 2015, and calculates an LLR based on the estimated noise variance per RE group. Here, an operation of estimating the noise variance per RE group has a form of duplicated calculation, so the operation may be implemented with a complexity almost similar to a general noise variance estimating operation.

The channel decoder 2021 performs a channel decoding operation based on the LLR outputted from the LLR generator 2019.

Although the CRS-IC unit 2011, the channel estimator #1 2013, the MMSE-IRC unit 2015, the channel estimator #2 2017, the LLR generator 2019, and the channel decoder 2021 are described as separate units in the signal receiving apparatus 2000 in FIG. 20, it is to be understood that the signal receiving apparatus 2000 may be implemented with a form into which at least two of the CRS-IC unit 2011, the channel estimator #1 2013, the MMSE-IRC unit 2015, the channel estimator #2 2017, the LLR generator 2019, and the channel decoder 2021 are incorporated. The signal receiving apparatus 2000 may be implemented with one processor.

Another example of an inner structure of a signal receiving apparatus in a communication system supporting an OFDMA scheme according to an embodiment of the present disclosure has been described with reference to FIG. 20, and still another example of an inner structure of a signal receiving apparatus in a communication system supporting an OFDMA scheme according to an embodiment of the present disclosure will be described with reference to FIG. 21.

Figure 21:
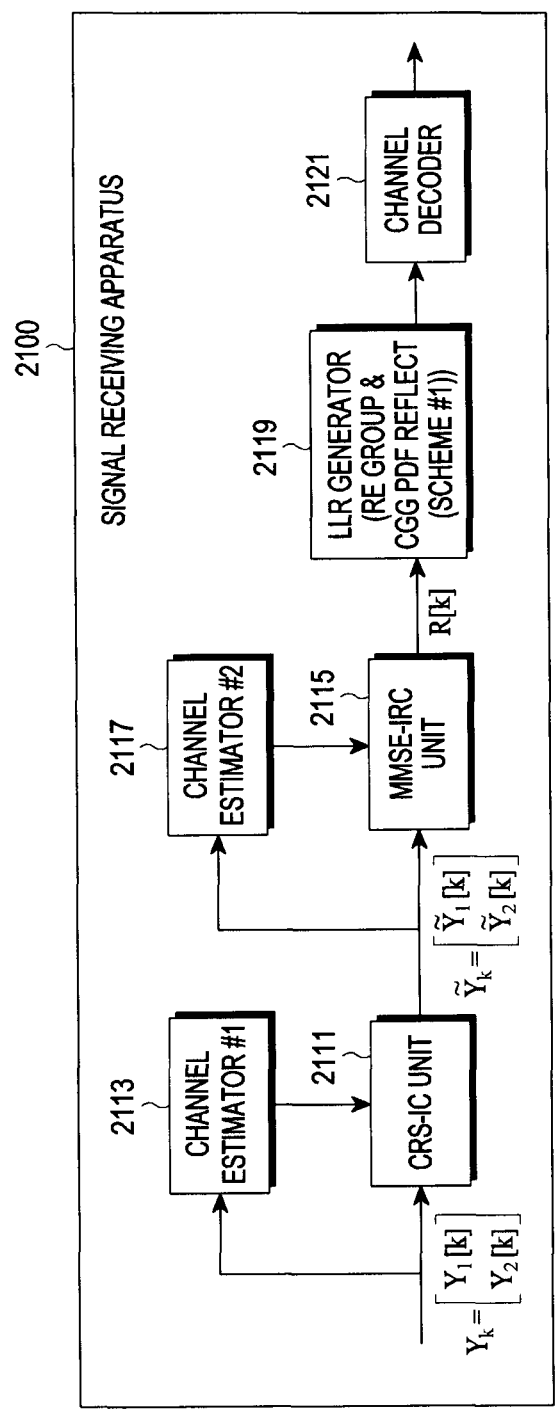
FIG. 21 schematically illustrates still another example of an inner structure of a signal receiving apparatus in a communication system supporting an OFDMA scheme according to an embodiment of the present disclosure.

FIG. 21 schematically illustrates still another example of an inner structure of a signal receiving apparatus in a communication system supporting an OFDMA scheme according to an embodiment of the present disclosure.

Referring to FIG. 21, a signal receiving apparatus 2100 includes a CRS-IC unit 2111, a channel estimator #1 2113, an MMSE-IRC unit 2115, a channel estimator #2 2117, an LLR generator 2119, and a channel decoder 2121.

Firstly, $Y_k$ as the kth received symbol vector is inputted to each of the CRS-IC unit 2111 and the channel estimator #1 2113. Here, $Y_k$ may be expressed as Equation 8.

The channel estimator #1 2113 estimates a channel based on $Y_k$ to generate a channel estimation value, e.g., a channel estimation value in which ICI is considered, and outputs the channel estimation value to the CRS-IC unit 2111.

The CRS-IC unit 2111 performs a CRC-IC operation based on $Y_k$ and the channel estimation value outputted from the channel estimator #1 2113 to generate a result value $\tilde{Y}_k$, and outputs the result value $\tilde{Y}_k$ to each of the MMSE-IRC unit 2115 and the channel estimator #2 2117. Here, $\tilde{Y}_k$ may be expressed as Equation 9.

The channel estimator #2 2117 estimates a channel based on $\tilde{Y}_k$ outputted from the CRS-IC unit 2111 to generate a channel estimation value, e.g., a channel estimation value in which a target signal is considered, and outputs the channel estimation value to the MMSE-IRC unit 2115.

The MMSE-IRC unit 2115 performs an MMSE-IRC operation based on $\tilde{Y}_k$ outputted from the CRS-IC unit 2111 and the channel estimation value outputted from the channel estimator #2 2117 to generate a result value R[k], and outputs the result value R[k] to the LLR generator 2119. R[k] may be expressed as Equation 14.

$$R[k] = W_k \tilde{Y}_k = a[k]s[k] + \mu[k] \quad [\text{Equation 14}]$$

where $$W_k = \hat{H}_k^H \left( \hat{H}_k \hat{H}_k^H + \text{Cov}(n) \right)^{-1} = [w_1[k] \quad w_2[k]]$$

-continued $$\hat{H}_k = \begin{bmatrix} \hat{H}_{11}[k] \\ \hat{H}_{21}[k] \end{bmatrix}, n_k = \begin{bmatrix} n_1[k] \\ n_2[k] \end{bmatrix},$$

$$Cov(n) = E\{nn^H\} =$$

$$\frac{1}{N_{CRS}} \sum_{k \in CRS\ index} (\tilde{Y}_k - \hat{H}_k c_k)(\tilde{Y}_k - \hat{H}_k c_k)^H$$

$$\mu \sim CN(0, (w_1[k])^2 \hat{\sigma}_1^2 + (w_2[k])^2 \hat{\sigma}_2^2),$$

$$a[k] = w_1[k]\hat{H}_{11}[k] + w_2[k]\hat{H}_{21}[k],$$

$$\mu[k] = w_1[k]n_1[k] + w_2[k]n_2[k]$$

It will be noted that R[k] as expressed in Equation 14 is R[k] in a case of, for example, SIMO (a case that the number of transmission antennas is 1, and the number of reception antennas is 2).

The LLR generator 2119 generates an LLR based on R[k] outputted from the MMSE-IRC unit 2115, and outputs the generated LLR to the channel decoder 2121. Here, the LLR may be expressed as Equation 15.

$$L_{k,\lambda}^G(R[k], a[k], RB\ index, Group\ index) \approx \quad [\text{Equation 15}]$$

$$\left[ \sqrt{\frac{1}{(\beta_{Group\ index}^{RB\ index})^2}} \left\{ \begin{array}{l} \min_{s \in A_0^\lambda} |R[k] - a[k]s|^2 - \\ \min_{s \in A_1^\lambda} |R[k] - a[k]s|^2 \end{array} \right\} \right]^{\alpha_{Group\ index}^{RB\ index}}$$

where $$\alpha_{Group\ index}^{RB\ index} = \frac{-0.3398}{\ln\left(\frac{(D_{1,Group\ index}^{RB\ index})^2}{D_{2,Group\ index}^{RB\ index}} + 0.0101\right) + 0.0589},$$

$$\beta_{Group\ index}^{RB\ index} = \frac{\Gamma(2/\alpha)}{\Gamma(4/\alpha)} D_{2,Group\ index}^{RB\ index}$$

$$D_{2,Group\ index}^{RB\ index} = \frac{1}{N_{Group\ index}^{RB\ index}} \sum_{k=1}^{N_{Group\ index}^{RB\ index}} X_2[k],$$

$$D_{1,Group\ index}^{RB\ index} = \frac{1}{N_{Group\ index}^{RB\ index}} \sum_{k=1}^{N_{Group\ index}^{RB\ index}} X_1[k]$$

$$X_2[k] = \min_{s \in A_0 \cup A_1} |R[k] - a[k]s|^2, X_1[k] = \sqrt{X_2[k]}$$

In Equation 15, $\alpha_{Group\ index}^{RB\ index}$ denotes a shape parameter of CGG PDF which is estimated using an RE sample within a given group index and RB index. In Equation 15, $\beta_{Group\ index}^{RB\ index}$ denotes a scale parameter of CGG PDF which is estimated using an RE sample within a given group index and RB index.

The LLR generator 2119 estimates noise variance per RE group for R[k] outputted from the MMSE-IRC unit 2115, and calculates an LLR based on the estimated noise variance per RE group. Here, an operation of estimating the noise variance per RE group has a form of duplicated calculation, so the operation may be implemented with a complexity almost similar to a general noise variance estimating operation. As expressed in Equation 15, the LLR generator 2119 needs to perform a calculation such as √ computation, log( ) computation, Γ( ) computation, ( )α computation, and/or the like upon generating an LLR.

The channel decoder 2121 performs a channel decoding operation based on the LLR outputted from the LLR generator 2119.

Although the CRS-IC unit 2111, the channel estimator #1 2113, the MMSE-IRC unit 2115, the channel estimator #2 2117, the LLR generator 2119, and the channel decoder 2121 are described as separate units in the signal receiving apparatus 2100 in FIG. 21, it is to be understood that the signal receiving apparatus 2100 may be implemented with a form into which at least two of the CRS-IC unit 2111, the channel estimator #1 2113, the MMSE-IRC unit 2115, the channel estimator #2 2117, the LLR generator 2119, and the channel decoder 2121 are incorporated. The signal receiving apparatus 2100 may be implemented with one processor.

Still another example of an inner structure of a signal receiving apparatus in a communication system supporting an OFDMA scheme according to an embodiment of the present disclosure has been described with reference to FIG. 21, and still another example of an inner structure of a signal receiving apparatus in a communication system supporting an OFDMA scheme according to an embodiment of the present disclosure will be described with reference to FIG. 22.

Figure 22:
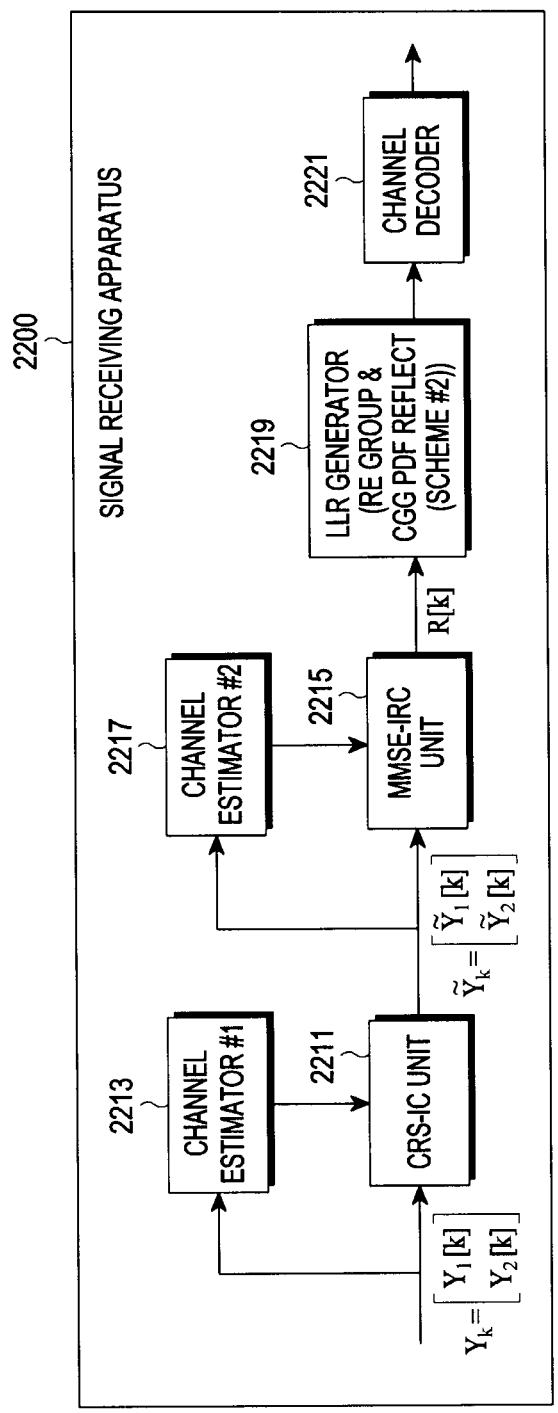
FIG. 22 schematically illustrates still another example of an inner structure of a signal receiving apparatus in a communication system supporting an OFDMA scheme according to an embodiment of the present disclosure.

FIG. 22 schematically illustrates still another example of an inner structure of a signal receiving apparatus in a communication system supporting an OFDMA scheme according to an embodiment of the present disclosure.

Referring to FIG. 22, a signal receiving apparatus 2200 includes a CRS-IC unit 2211, a channel estimator #1 2213, an MMSE-IRC unit 2215, a channel estimator #2 2217, an LLR generator 2219, and a channel decoder 2221.

Firstly, $Y_k$ as the kth received symbol vector is inputted to each of the CRS-IC unit 2211 and the channel estimator #1 2213. Here, $Y_k$ may be expressed as Equation 8.

The channel estimator #1 2213 estimates a channel based on $Y_k$ to generate a channel estimation value, e.g., a channel estimation value in which ICI is considered, and outputs the channel estimation value to the CRS-IC unit 2211.

The CRS-IC unit 2211 performs a CRC-IC operation based on $Y_k$ and the channel estimation value outputted from the channel estimator #1 2213 to generate a result value $\tilde{Y}_k$, and outputs the result value $\tilde{Y}_k$ to each of the MMSE-IRC unit 2215 and the channel estimator #2 2217. Here, $\tilde{Y}_k$ may be expressed as Equation 9.

The channel estimator #2 2217 estimates a channel based on $\tilde{Y}_k$ outputted from the CRS-IC unit 2211 to generate a channel estimation value, e.g., a channel estimation value in which a target signal is considered, and outputs the channel estimation value to the MMSE-IRC unit 2215.

The MMSE-IRC unit 2215 performs an MMSE-IRC operation based on $\tilde{Y}_k$ outputted from the CRS-IC unit 2211 and the channel estimation value outputted from the channel estimator #2 2217 to generate a result value R[k], and outputs the result value R[k] to the LLR generator 2219. R[k] may be expressed as Equation 14.

The LLR generator 2219 generates an LLR based on R[k] outputted from the MMSE-IRC unit 2215, and outputs the generated LLR to the channel decoder 2221. The LLR may be expressed in FIG. 23.

In the LLR as expressed in FIG. 23 compared to an LLR as expressed in Equation 15, $$\frac{\Gamma(2/\alpha)}{\Gamma(4/\alpha)}$$

related to $\beta_{Group\ index}^{RB\ index}$ is changed to a constant value, and a $\alpha_{Group\ index}^{RB\ index}$ value is quantized, so the LLR generator 2219 does not need to perform a computation such as $\Gamma(\ )$ computation, $(\ )\alpha$ computation, and/or the like. For example, $\alpha_{Group\ index}^{RB\ index}$ may be quantized as one of 0.5, 1, 1.5, and 2.

The LLR generator 2219 estimates noise variance per RE group for R[k] outputted from the MMSE-IRC unit 2215, and calculates an LLR based on the estimated noise variance per RE group. Here, an operation of estimating the noise variance per RE group has a form of duplicated calculation, so the operation may be implemented with a complexity almost similar to a general noise variance estimating operation. As expressed in Equation 16, the LLR generator 2219 needs to perform a complex calculation such as $\Gamma(\ )$ computation, $(\ )\alpha$ computation, and/or the like upon generating an LLR.

The channel decoder 2221 performs a channel decoding operation based on the LLR outputted from the LLR generator 2219.

Although the CRS-IC unit 2211, the channel estimator #1 2213, the MMSE-IRC unit 2215, the channel estimator #2 2217, the LLR generator 2219, and the channel decoder 2221 are described as separate units in the signal receiving apparatus 2200 in FIG. 22, it is to be understood that the signal receiving apparatus 2200 may be implemented with a form into which at least two of the CRS-IC unit 2211, the channel estimator #1 2213, the MMSE-IRC unit 2215, the channel estimator #2 2217, the LLR generator 2219, and the channel decoder 2221 are incorporated. The signal receiving apparatus 2200 may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for channel decoding by a user equipment (UE) in a communication system, the method comprising:
    generating at least two resource element (RE) groups including at least two REs, wherein the at least two RE groups includes a first RE group that is affected by an interference signal and a second RE group that is not affected by the interference signal;
    canceling, a target signal of a serving base station, from a received signal that corresponds to the first RE group and canceling the target signal from a received signal that corresponds to the second RE group; and
    generating a decoding metric for the received signal that corresponds to the first RE group based on a signal generated by canceling the target signal from the received signal that corresponds to the first RE group and generating a decoding metric for the received signal that corresponds to the second RE group based on a signal generated by canceling the target signal from the received signal that corresponds to the second RE group.

2. The method of claim 1, wherein the generating the at least two RE groups comprises:
    generating the at least two REs as the at least two RE groups is based on an interference characteristic.

3. The method of claim 1, wherein the generating the at least two RE groups comprises:
    generating the at least two RE groups that includes an RE group including at least one RE that is not affected by an interference signal and an RE group including at least one RE that is affected by the interference signal.

4. The method of claim 1, further comprising:
    receiving information related to an interference signal from a base station,
    wherein the information related to the interference signal includes information related to a reference signal transmitted from other base station.

5. The method of claim 1, wherein the decoding metric includes:

a soft decision decoding metrics corresponding to the first RE group and the second RE group.

6. The method of claim 1, wherein generating the decoding metric comprises:
estimating a soft decision decoding metric parameter for each of the signal generated by canceling the target signal from the received signal that corresponds to the first RE group and the signal generated by canceling the target signal from the received signal that corresponds to the second RE group; and
canceling the target signal from the received signal that corresponds to the first RE group, and calculating a soft decision decoding metric for the received signal that corresponds to the second RE group based on the soft decision decoding metric parameter that is estimated for the signal generated by canceling the target signal from the received signal that corresponds to the second RE group.

7. A user equipment (UE) for channel decoding in a communication system, the UE comprising:
a transceiver configured to communicate with a base station; and
a processor coupled with the transceiver and configured to:
generate at least two resource element (RE) groups including at least two REs, wherein the at least two RE groups includes a first RE group that is affected by an interference signal and a second RE group that is not affected by the interference signal,
cancel, a target signal of a serving base station, from a received signal that corresponds to the first RE group and canceling the target signal from a received signal that corresponds to the second RE group, and
generate a decoding metric for the received signal that corresponds to the first RE group based on a signal generated by canceling the target signal from the received signal that corresponds to the first RE group and generating a decoding metric for the received signal that corresponds to the second RE group based on a signal generated by canceling the target signal from the received signal that corresponds to the second RE group.

8. The UE of claim 7, wherein the processor further configured to:
generate the at least two REs as the at least two RE groups that includes an RE group including at least one RE that is not affected by an interference signal and an RE group including at least one RE that is affected by the interference signal.

9. The UE of claim 7, wherein the processor further configured to:
receive information related to an interference signal from a base station,
wherein the information related to the interference signal includes information related to a reference signal transmitted from other base station.

10. The UE of claim 7, wherein the decoding metric includes
a soft decision decoding metrics corresponding to the first RE group and the second RE group.

11. The UE of claim 7, wherein the processor is further configured to:
estimate a soft decision decoding metric parameter for each of the signal generated by canceling the target signal from the received signal that corresponds to the first RE group and the signal generated by canceling the target signal from the received signal that corresponds to the second RE group; and
calculate a soft decision decoding metric for the received signal that corresponds to the first RE group based on the soft decision decoding metric parameter that is estimated for the signal generated by canceling the target signal from the received signal that corresponds to the first RE group, and calculate a soft decision decoding metric for the received signal that corresponds to the second RE group based on the soft decision decoding metric parameter that is estimated for the signal generated by canceling the target signal from the received signal that corresponds to the second RE group.

* * * * *